United States Patent
Yang et al.

(10) Patent No.: US 10,713,830 B1
(45) Date of Patent: Jul. 14, 2020

(54) ARTIFICIAL INTELLIGENCE BASED IMAGE CAPTION CREATION SYSTEMS AND METHODS THEREOF

(71) Applicant: GYRFALCON TECHNOLOGY INC., Milpitas, CA (US)

(72) Inventors: Lin Yang, Milpitas, CA (US); Baohua Sun, Fremont, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 0 days.

(21) Appl. No.: 16/410,997

(22) Filed: May 13, 2019

(51) Int. Cl.
*G06T 11/60* (2006.01)
*G06K 9/00* (2006.01)
*G06K 9/62* (2006.01)

(52) U.S. Cl.
CPC .......... *G06T 11/60* (2013.01); *G06K 9/00684* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 5,067,164 A | 11/1991 | Denker et al. | |
| 6,519,363 B1 | 2/2003 | Su et al. | |
| 6,665,436 B2 | 12/2003 | Su et al. | |
| 6,941,513 B2 | 9/2005 | Meystel et al. | |
| 8,321,222 B2 | 11/2012 | Pollet et al. | |
| 8,726,148 B1 | 5/2014 | Battilana | |
| 9,026,432 B2 | 5/2015 | Langvil | |
| 2003/0108239 A1 | 6/2003 | Su et al. | |
| 2003/0110035 A1 | 6/2003 | Thong et al. | |
| 2008/0130996 A1 | 6/2008 | Sternby | |
| 2009/0048841 A1 | 2/2009 | Pollet et al. | |
| 2010/0158394 A1 | 6/2010 | Chang et al. | |
| 2010/0286979 A1 | 11/2010 | Zangvil et al. | |
| 2012/0042240 A1* | 2/2012 | Oliveira | G06F 40/106 715/243 |
| 2013/0002553 A1 | 1/2013 | Colley | |

(Continued)

OTHER PUBLICATIONS

Shur et al. "A Corpus of Natural Language for Visual Reasoning", 2017, Facebook AI Research, Menlo Park, CA.

(Continued)

*Primary Examiner* — Frank S Chen
(74) *Attorney, Agent, or Firm* — RC Patent Services

(57) ABSTRACT

An image and the maximum number of tokens for a to-be-created image caption are received in a computing system. Font size of graphical image of the token is calculated from the maximum number of tokens and the dimension of desired input image for prediction-style image classification technique. Desired input image is divided into first and second portions. A 2-D symbol is formed by placing a resized image derived from the received image with substantially similar contents in the first portion and by initializing the second portion with blank images. Next token of the image caption is predicted by classifying the 2-D symbol using the prediction-style image classification technique. 2-D symbol is modified by appending the graphical image of just-predicted token to the existing image caption in the second portion, if termination condition for image caption creation is false. Next token is repeatedly predicted until termination condition becomes true.

18 Claims, 32 Drawing Sheets

(56) References Cited

U.S. PATENT DOCUMENTS

| | | |
|---|---|---|
| 2013/0060786 A1 | 3/2013 | Serrano et al. |
| 2014/0040270 A1 | 2/2014 | O'Sullivan et al. |
| 2014/0355835 A1 | 12/2014 | Rodriguez-Serrano et al. |
| 2015/0193431 A1 | 7/2015 | Stoytchev et al. |
| 2017/0004184 A1 | 1/2017 | Jain et al. |
| 2017/0011279 A1 | 1/2017 | Soldevila et al. |
| 2017/0032035 A1 | 2/2017 | Gao et al. |
| 2017/0177710 A1 | 6/2017 | Burlik |
| 2018/0060302 A1 | 3/2018 | Liang et al. |
| 2018/0150457 A9 | 5/2018 | Stoytchev et al. |
| 2018/0150956 A1 | 5/2018 | Kao et al. |
| 2020/0043487 A1* | 2/2020 | Moriya ................ G06F 16/00 |
| 2020/0057805 A1* | 2/2020 | Lu ...................... G06K 9/6277 |
| 2020/0082581 A1* | 3/2020 | Chen .................... G06T 11/60 |

OTHER PUBLICATIONS

Yoon Kim, "Convolutional Neural Networks for Sentence Classification", Sep. 2014, New York University.

Rastegari et al. "XNOR-Net: ImageNet Classification Using Binary Convolutional Neural Networks", Aug. 2, 2016, Allen Institute for AI, Univ. of Washington.

Gysel et al. "Hardware-Oriented Approximation of Convolutional Neural Networks", Oct. 20, 2016, Department of Electrical and Computer Engineering, University of California, Davis, CA.

\* cited by examiner

ZxZ pixel locations (Z/2)x(Z/2) pixel locations

ARTIFICIAL INTELLIGENCE BASED IMAGE CAPTION CREATION SYSTEMS AND METHODS THEREOF

CROSS-REFERENCE TO RELATED APPLICATIONS

This application is related to a co-pending U.S. patent application Ser. No. 16/410,984 for "Methods and Systems for Extracting Stories out of Images" filed May 13, 2019 by Lin Yang and Baohua Sun.

FILED

This patent document relates generally to the field of machine learning. More particularly, the present document relates to artificial intelligence based image caption creation systems and methods thereof.

BACKGROUND

Machine learning is an application of artificial intelligence. In machine learning, a computer or computing device is configured to think like human beings so that the computer may be taught to learn on its own. The development of neural networks has been key to training computers via a deep learning model to understand the world in the way human beings do.

In recent years, with the advancement of digital camera, smart cell phone and digital video recording devices, the advancement of imaging processing and streaming techniques, the vast and economic availability of digital storage spaces and the wide spread of internet availability, enormous amount of digital generated images is readily available for online marketing, social media, educational, and medical purposes. Applications generated for the above-mentioned areas often require to have the story behind the image when an image is presented in order to enhance the presentation. Although it is prone for human errors and the story varies from person to person, for a relatively small number of images, it is possible for human beings to carry the task of extracting stories out of the available images. However, when the number of images is massive in area of on-line marketing, educational, medical or even social media, it is much economic and efficient to use artificial intelligence devices to carry out the task of extracting stories out of images.

Image caption has many applications in real world. Prior approaches usually involve deep learning models to process image and text separately. Firstly, the input image is fed into a deep learning model (generally to convolutional neural network based) to extract features; then the extracted feature vector is concatenated with the word embeddings of current partial predicted sentence; and at last, the concatenation of vector input is fed into another deep learning model (generally recurrent neural network based) to predict the next token, i.e. words or characters. The final output would be a concatenation of the string of tokens to form a sentence as the image caption.

SUMMARY

This section is for the purpose of summarizing some aspects of the invention and briefly introduce some preferred embodiments. Simplifications or omissions in this section as well as in the abstract and the title herein may be made to avoid obscuring the purpose if the section. Such simplification or omissions are not intended to limit the scope of the invention.

Artificial intelligence based image caption creation systems and methods thereof are disclosed. According to an aspect of the disclosure, an image and the maximum number of tokens for a to-be-created image caption are received in a computing system. Font size of graphical image of the token is calculated from the maximum number of tokens and the dimension of a desired input image for a prediction-style image classification technique. The desired input image is divided into first and second portions. A 2-D symbol as the desired input image is formed by placing a resized image derived from the received image with substantially similar contents in the first portion and by initializing the second portion with blank images. Next token of the image caption is predicted by classifying the 2-D symbol using the prediction-style image classification technique. 2-D symbol is modified by appending the graphical image of just-predicted token to the existing image caption in the second portion, if termination condition for image caption creation is false. Next token is repeatedly predicted until termination condition becomes true. Token is a word in Latin-alphabet based languages (e.g., English) and a character in Chinese, Japanese, Korean (CJK) languages.

According to another aspect, a system for creating an image caption of an image comprises: a bus; an input interface connecting to the bus; a Cellular Neural Networks or Cellular Nonlinear Networks (CNN) based integrated circuit operatively connected to the bus; a memory connecting the bus; and a processing unit connecting to the bus. The system is configured for performing following operations: an image and the maximum number of tokens for a to-be-created image caption are received in a computing system. Font size of the token is calculated from the maximum number of tokens and the dimension of a desired input image for a prediction-style image classification technique. The desired input image is divided into first and second portions. A 2-D symbol as the desired input image is formed by placing a resized image derived from the received image with substantially similar contents in the first portion and by initializing the second portion with blank images. The next token of the image caption is predicted by classifying the 2-D symbol using the prediction-style image classification technique. 2-D symbol is modified by appending the just-predicted token to the existing image caption in the second portion, if the termination condition for image caption creation is false. The next token is repeatedly predicted until the termination condition becomes true.

Objects, features, and advantages of the invention will become apparent upon examining the following details description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "vertical", "horizontal", "diagonal", "left", "right", "top", "bottom", "column", "row", "diagonally" are intended to provide relative positions for the purposes of description, and are not intended to designate an absolute frame of reference. Additionally, used herein, term "character" and "script" are used interchangeably.

Embodiments of the invention are discussed herein with reference to FIGS. 1-22. However, those skilled in the art will readily appreciate that the detailed description given herein with respect to these figures is for explanatory purposes as the invention extends beyond these limited embodiments.

Figure 1:
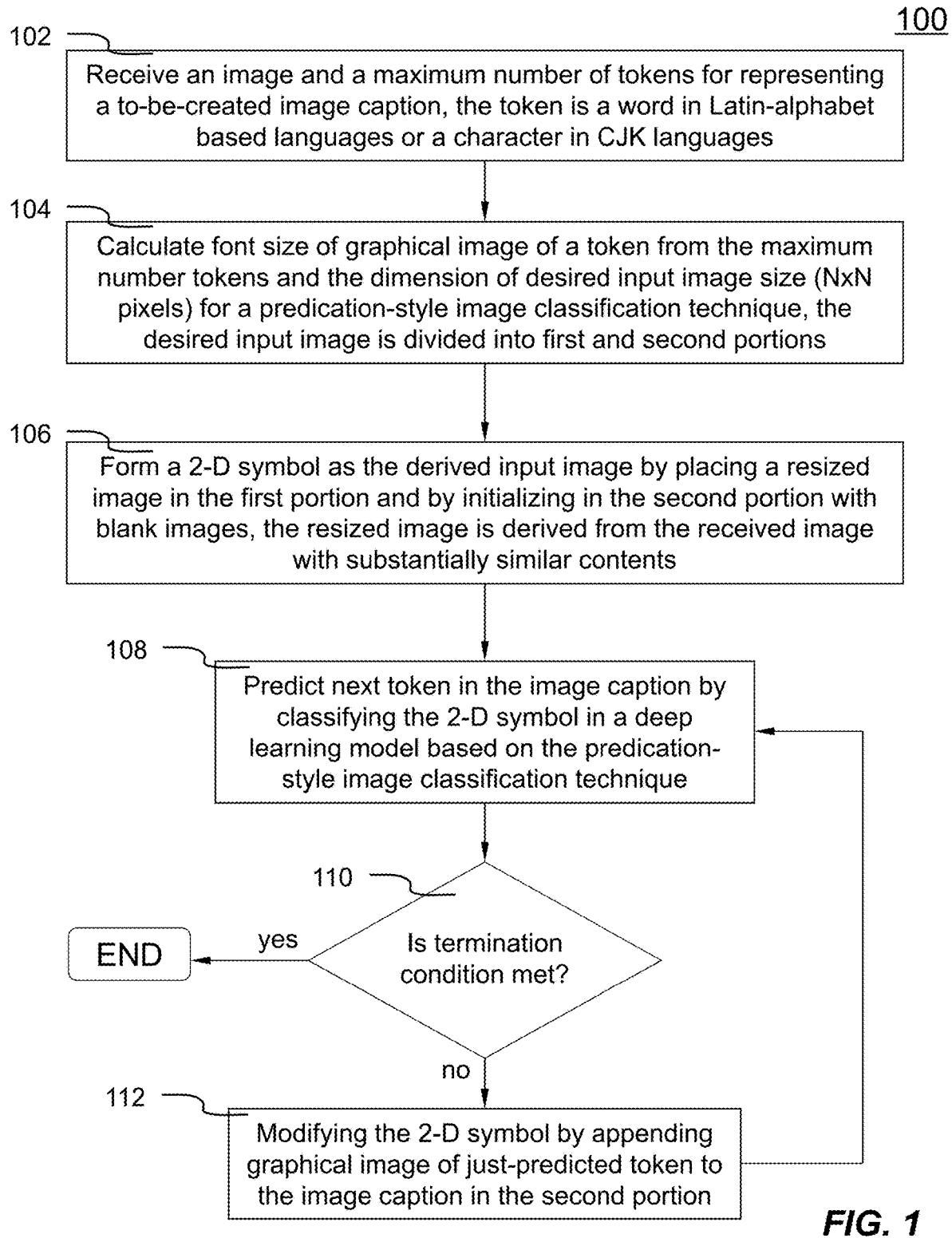
FIG. 1 is a flowchart illustrating an example process of creating an image caption out of an image in accordance with one embodiment of the invention.
Figure 2:
FIG. 2 is a diagram showing a first example image according to an embodiment of the invention.
Figure 3:
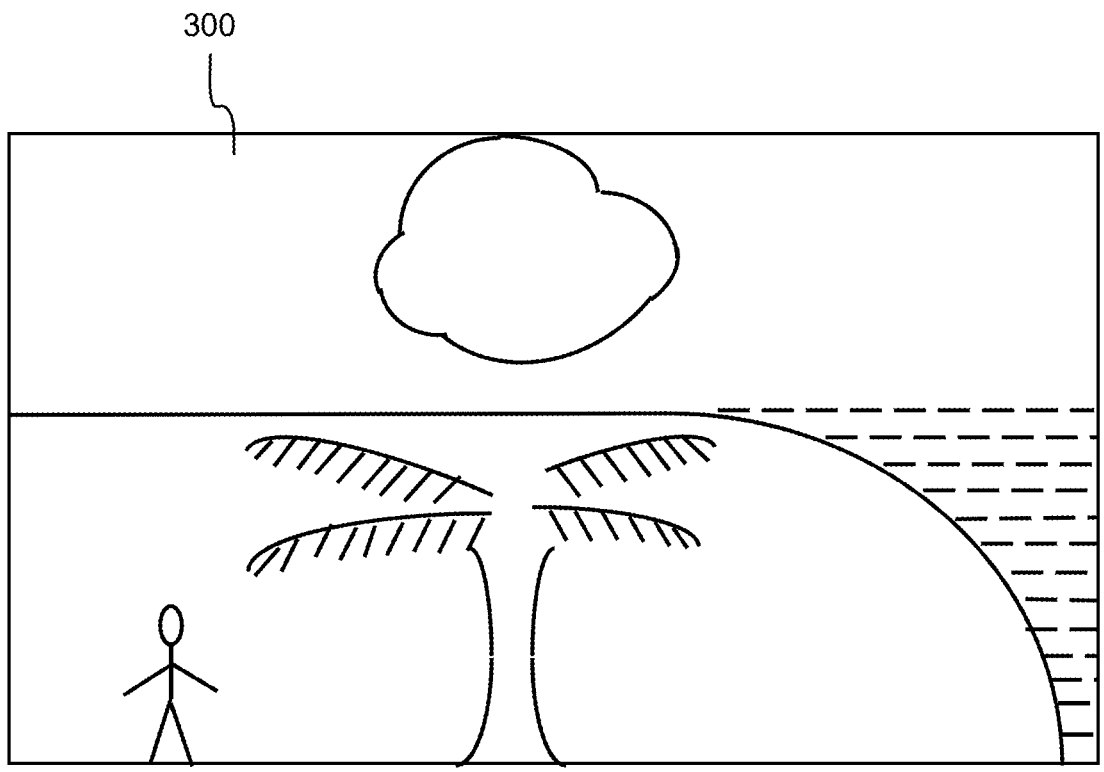
FIG. 3 is a diagram showing a second example image according to an embodiment of the invention.

Referring first to FIG. 1, a flowchart is illustrated for an example computer-implemented process 100 of creating an image caption of an image. Process 100 starts by receiving an image and a maximum number of tokens for representing a to-be-created image caption in a computer system (e.g., device 2100) at action 102. Received images may include, are not limited to, scenery, painting, cartoon, computer-generated image, etc. One example image 200 is shown in FIG. 2. Another example image 300 is shown in FIG. 3. Token is a word in Latin-alphabet based languages (e.g., English) and a character in Chinese, Japanese, Korean (CJK) languages.

For example in one embodiment, a maximum number of tokens is 14 for image caption in English language. In other words, the image caption of a received image can have up to 14 English words. In another embodiment, the maximum number of tokens is 32 for image caption in Chinese language.

At action 104, font size of the token is calculated from the maximum number of tokens and the dimension of a desired input image for a deep learning model based on the prediction-style image classification technique. The dimension of a desired input image is N×N pixels with N being a positive number and a multiple of 224. The desired input image is divided into two portions with a first portion for containing a resized image derived from the received image and a second portion for the image caption.

Next, at action 106, a two-dimensional (2-D) symbol as the desired input image is formed by placing a resized image in the first portion and by initializing the second portion with blank images. The resized image is derived from the received image with substantially similar contents. The second portion is configured for containing the to-be-created image caption of the resized image that contains substantially similar contents/features of the received image.

Figure 6:
FIG. 6 is a diagram showing a first example 2-D symbol with image caption in accordance with one embodiment of the invention.
Figure 7:
FIG. 7 is a diagram showing a second example 2-D symbol with image caption in accordance with one embodiment of the invention.
Figure 8:
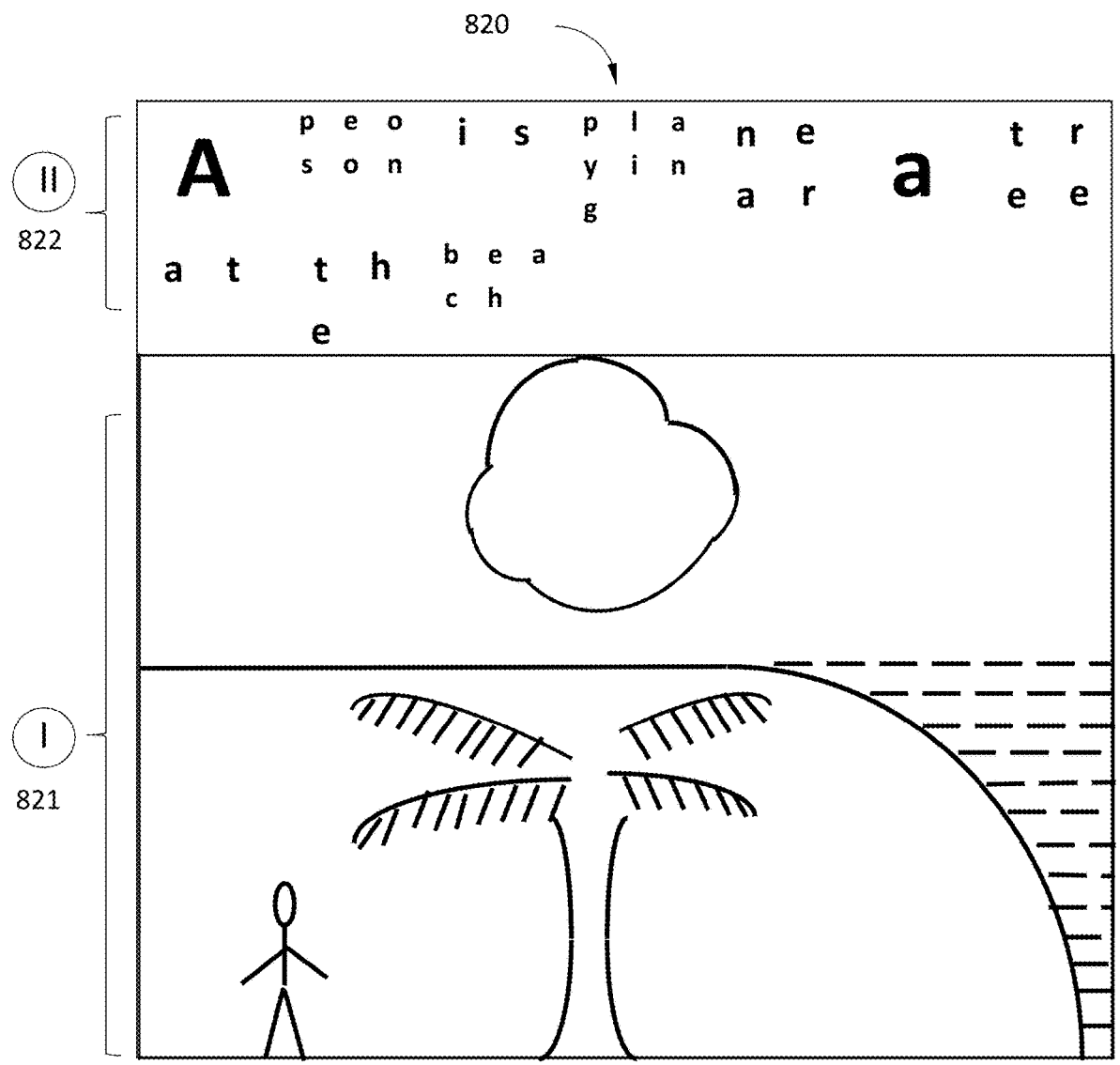
FIG. 8 is a diagram showing a third example 2-D symbol with image caption in accordance with one embodiment of the invention.

Example font size of a token is 32×32 pixels for English language and 25×25 pixels for Chinese language when N is 224. The resized image for English image caption is 224× 150 pixels, while the resized image for Chinese image caption is 170×170 pixels. Example 2-D symbols are shown in FIGS. 6-8. Different portions of the 2-D symbol are designated for containing image caption.

Next, at action 108, the 2-D symbol is classified in a deep learning model (e.g., convolutional neural networks such as VGG-16 model) based on the prediction-style image classification technique. The most probable category of the 2-D symbol predicted by the deep learning model is the next token of the image caption. Process 100 moves to decision 110 to determine whether a termination condition for image caption creation met. If not, process 100 follows the 'no' branch to action 112. The 2-D symbol is modified by appending the just-predicted token to the image caption in the second portion. Process 100 repeats actions 108, 110 and 112 until decision 110 becomes true. Process 100 ends thereafter.

There are a number of termination conditions for image caption creation. In one embodiment, the termination condition is met when the maximum number of tokens have been predicted. In another embodiment, the termination condition is met when a special mark is predicted, for example, an End-Of-Sentence (EOS) mark. EOS mark is designated for indicating the entire sentence of the image caption has been created. In another embodiment, EOS is an End-Of-Prediction (EOP) mark The iterative actions of predicting next token of an image caption are shown as an example series of schematic diagrams in FIGS. 5A-5D.

FIG. 2 shows a second image 200 which is a photo showing a lot of people walking down a street. FIG. 3 shows a first example image 300 which is an image depicting a person is playing under a tree at the beach. Respective image captions for the first and second example images can be created according to an embodiment of the invention.

Figure 4:
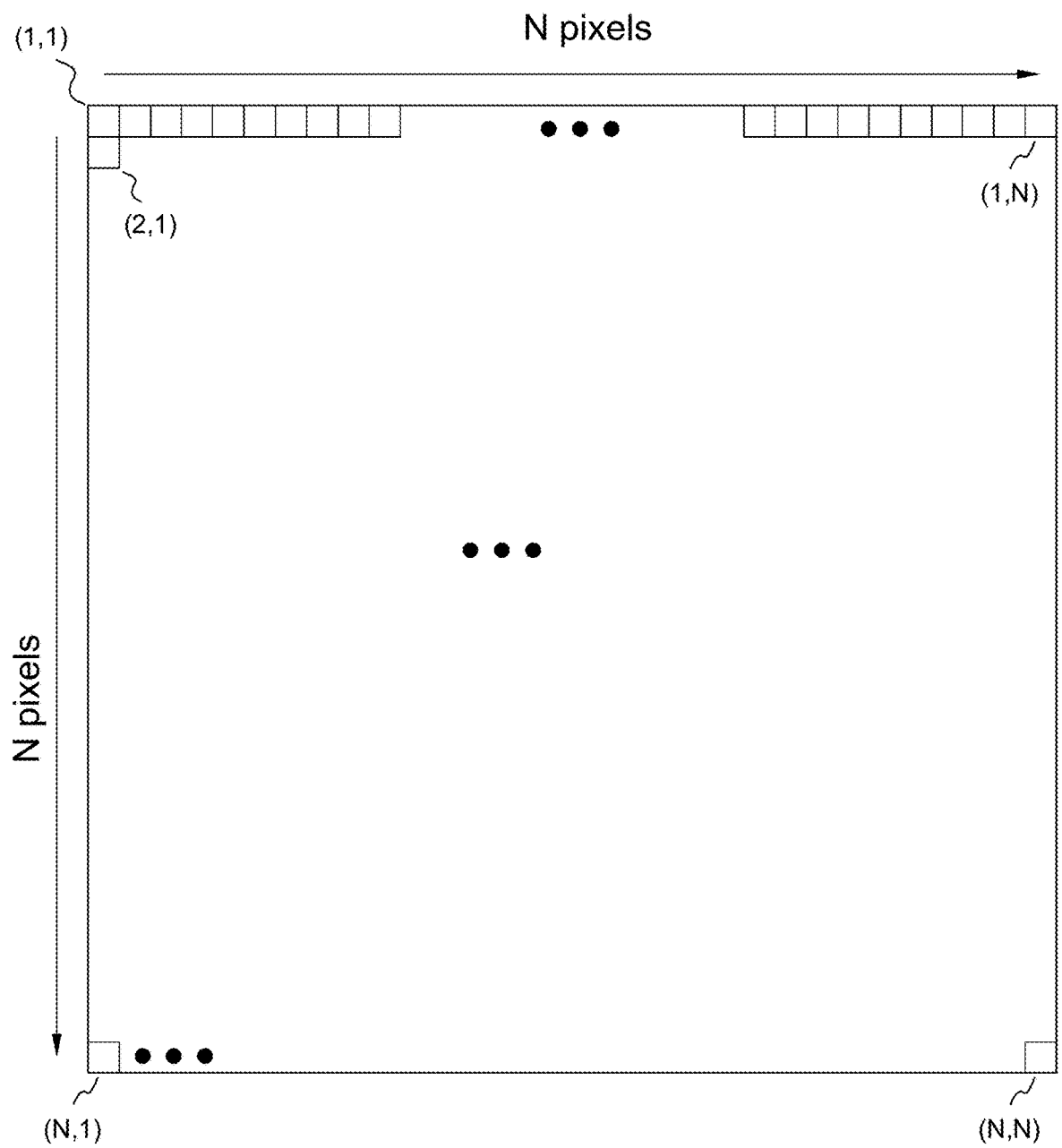
FIG. 4 is a diagram illustrating an example 2-D symbol comprising a matrix of N×N pixels of data for facilitating machine learning according to an embodiment of the invention.

Referring to FIG. 4, it is shown a diagram showing an example two-dimensional symbol 400 for facilitating machine learning. The two-dimensional symbol 400 comprises a matrix of N×N pixels (i.e., N columns by N rows) of data. Pixels are ordered with row first and column second as follows: (1,1), (1,2), (1,3), . . . (1,N), (2,1), . . . (N, 1), . . . (N,N). N is a positive integer or whole number, for examples, in one embodiment N is a positive integer and equals to a multiple of 224.

FIGS. 5A-5D show a sequence of 2-D symbols 500a-500d that are used for creating an image caption of the first example image 200. Each of the 2-D symbols 500a-500d is divided into first and second portions. The first portion 510 is configured for containing a resized image of the first image 510, while the second portion 520 is configured for containing image caption that is created word-by-word using a prediction-style image classification technique shown in FIGS. 11A-11C.

Figure 5A:
FIGS. 5A-5D is a series of diagrams showing an example sequence of image caption creation in accordance with an embodiment of the invention.

In the beginning of the image caption creation shown in FIG. 5A, a resized image is placed in the first portion 510 and blank images are place in the second portion 520. The corresponding category 541 for the 2-D symbol 500a is "A". In other words, filter coefficients of a convolutional neural network base on the prediction-style image classification technique are trained to predict "A" as the most probable category for 2-D symbol 500a. And "A" is a next token (i.e., English word) of the image caption of the image, which is the first example image 200.

Figure 5B:
Figure 5C:
Figure 5D:

After the next token of the image caption has been predicted, the token is placed in the second portion of the 2-D symbol 500b shown in FIG. 5B. The prediction-style image classification technique would find the most probable category 542 for the modified 2-D symbol 500b as "lot". Similar to previous procedure, the image caption in the second portion 520 is appended by the next token "lot" as the modified 2-D symbol 500c shown in FIG. 5C. The next token is category 543 "of". This procedure continues until a termination condition is met. One example termination condition is an End-Of-Sentence (EOS) mark is predicted as the most probably category 549 shown in FIG. 5D. As shown in FIGS. 5A-5D, tokens used in the second portion of the 2-D symbol are English words in a so-called squared-word format. The details of the squared-word format are described in FIGS. 9A-9B.

FIG. 6 shows a first example 2-D symbol 620, which contains a resized image of the first example image 200 located in the first portion 621 and image caption in the second portion 622. In this embodiment, the image caption contains English words in squared-word format, which is described in FIGS. 9A-9B and corresponding descriptions.

A second example 2-D symbol 720 is shown in FIG. 7. The first portion 721 is located in the middle of the 2-D symbol 720 while the second portion 722 is an area surrounding the first portion 721. In this embodiment, the image caption contains Chinese characters.

FIG. 8 shows a third example 2-D symbol 820. The first portion 821 contains a resized image of the second example image 300, while the second portion 822 contains image caption. In contrast to the first example 2-D symbol 620, the first portion 821 occupies the lower part of the 2-D symbol 820 in this embodiment. The image caption locations in the second portion 822 are in English with a squared-word format.

Figure 9A:
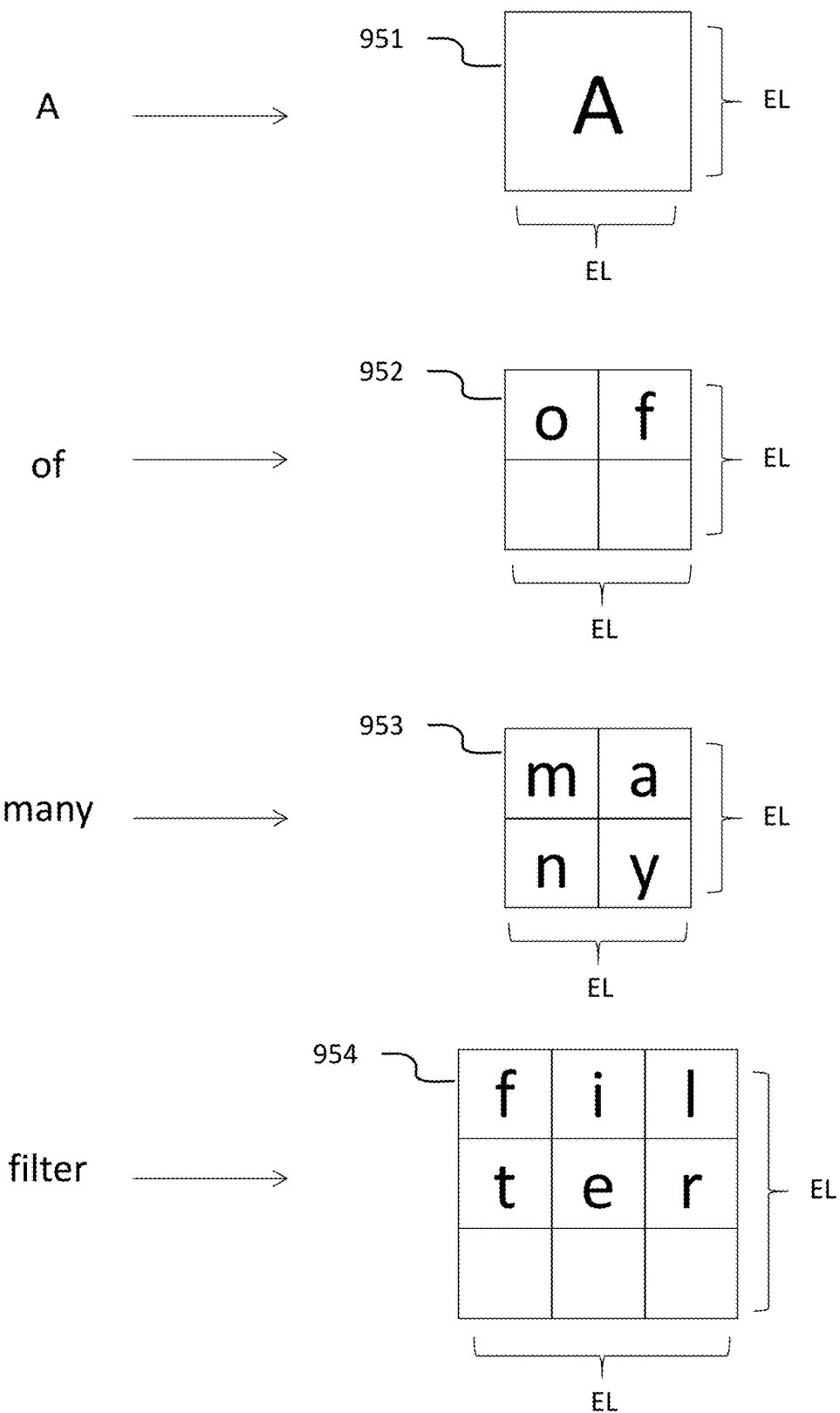
FIGS. 9A-9B are diagrams showing example schemes of a squared-word format representing a word of Latin-alphabet based language in accordance with an embodiment of the invention.
Figure 9B:
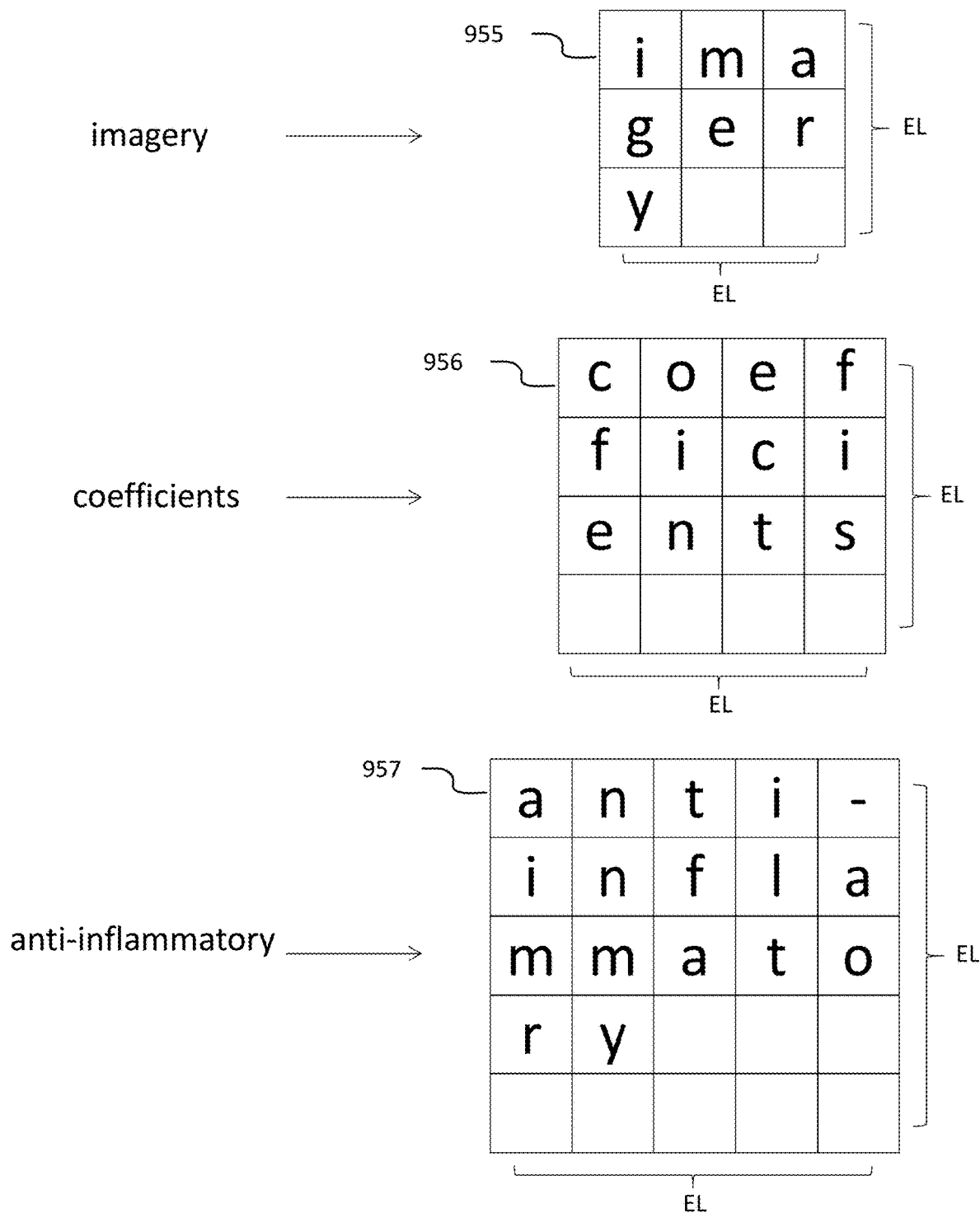

Various example squared-word formats 951-957 formed by English words are shown in FIGS. 9A-9B. Each of the squared-word formats 951-957 has a dimension EL letters by EL letters (i.e., row and column). EL is determined from the total number of letters (LL) contained in the corresponding word using the formula EL=Roof [Square Root(LL)]. Roof operation rounds the result of the square root of LL to the top value of the integer range indicated with [ ]. EL and LL are positive integers.

The first example squared-word format 951 contains one letter "A", both LL and EL equal one. The second example squared-word format 952 contains two letters "of", so LL is 2 while EL is also 2 because the square root of LL is 1.4 which is rounded to 2 (i.e., roof of the integer range). The third example squared-word format 953 contains four letters "many", LL is 4 while EL is 2. The fourth example squared-word format 954 contains "filter" thereby LL is 6 and EL is 3. The fifth example squared-word format 955 contains "imagery" hence LL is 7 and EL is 3. The sixth example squared-word format 956 contains "coefficients", LL is 12 and EL is 4. Finally, the seventh example squared-word format 957 contains "anti-inflammatory" hence LL is 18 while EL is 5. The average word length of Latin-alphabet based languages is between 4 and 6 letters.

Figure 10A:
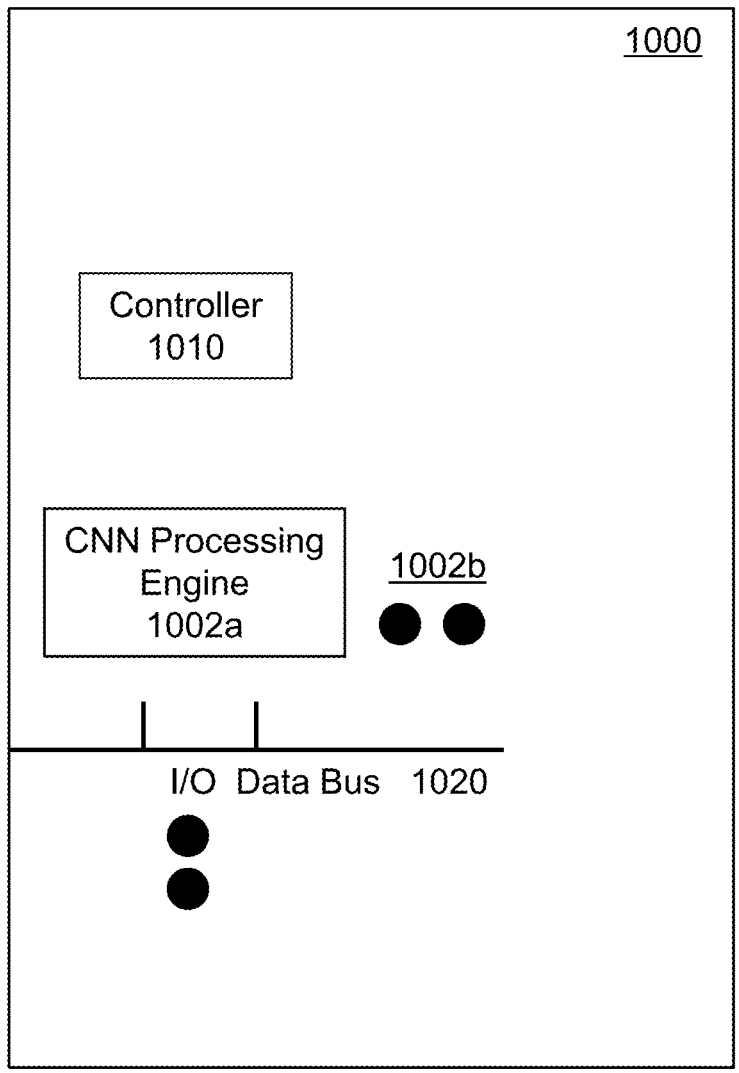
FIG. 10A is a block diagram illustrating an example Cellular Neural Networks or Cellular Nonlinear Networks (CNN) based computing system, according to one embodiment of the invention.

Referring now to FIG. 10A, it is shown a block diagram illustrating an example CNN based computing system 1000 configured for classifying a two-dimensional symbol.

The CNN based computing system 1000 may be implemented on integrated circuits as a digital semi-conductor chip (e.g., a silicon substrate in a single semi-conductor wafer) and contains a controller 1010, and a plurality of CNN processing units 1002a-1002b operatively coupled to at least one input/output (I/O) data bus 1020. Controller 1010 is configured to control various operations of the CNN processing units 1002a-1002b, which are connected in a loop with a clock-skew circuit (e.g., clock-skew circuit 2040 in FIG. 20).

In one embodiment, each of the CNN processing units 1002a-1002b is configured for processing imagery data (e.g., 2-D symbol 620 of FIG. 6).

Figure 10B:
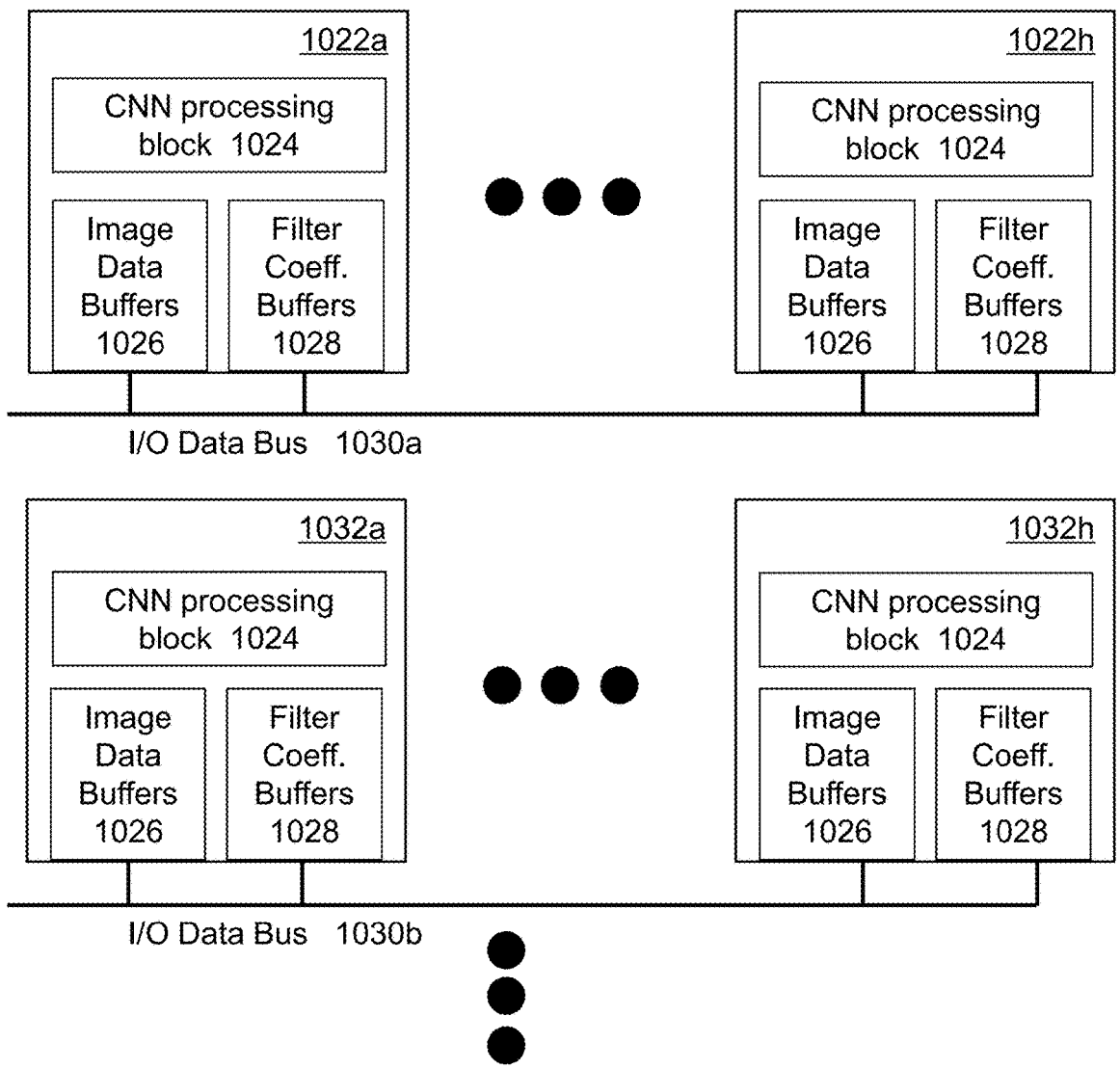
FIG. 10B is a block diagram illustrating an example CNN based integrated circuit for performing image processing based on convolutional neural networks, according to one embodiment of the invention.

In another embodiment, the CNN based computing system is a digital integrated circuit that can be extendable and scalable. For example, multiple copies of the digital integrated circuit may be implemented on a single semi-conductor chip as shown in FIG. 10B. In one embodiment, the single semi-conductor chip is manufactured in a single semi-conductor wafer.

All of the CNN processing engines are identical. For illustration simplicity, only few (i.e., CNN processing engines 1022a-1022h, 1032a-1032h) are shown in FIG. 10B. The invention sets no limit to the number of CNN processing engines on a digital semi-conductor chip.

Each CNN processing engine 1022a-1022h, 1032a-1032h contains a CNN processing block 1024, a first set of memory buffers 1026 and a second set of memory buffers 1028. The first set of memory buffers 1026 is configured for receiving imagery data and for supplying the already received imagery data to the CNN processing block 1024. The second set of memory buffers 1028 is configured for storing filter coefficients and for supplying the already received filter coefficients to the CNN processing block 1024. In general, the number of CNN processing engines on a chip is $2^n$, where n is an integer (i.e., 0, 1, 2, 3, . . . ). As shown in FIG. 10B, CNN processing engines 1022a-1022h are operatively coupled to a first input/output data bus 1030a while CNN processing engines 1032a-1032h are operatively coupled to a second input/output data bus 1030b. Each input/output data bus 1030a-1030b is configured for independently transmitting data (i.e., imagery data and filter coefficients). In one embodiment, the first and the second sets of memory buffers comprise random access memory (RAM), which can be a combination of one or more types, for example, Magnetic Random Access Memory, Static Random Access Memory, etc. Each of the first and the second sets are logically defined. In other words, respective sizes of the first and the second sets can be reconfigured to accommodate respective amounts of imagery data and filter coefficients.

The first and the second I/O data bus 1030a-1030b are shown here to connect the CNN processing engines 1022a-1022h, 1032a-1032h in a sequential scheme. In another embodiment, the at least one I/O data bus may have different connection scheme to the CNN processing engines to accomplish the same purpose of parallel data input and output for improving performance.

Figure 11A:
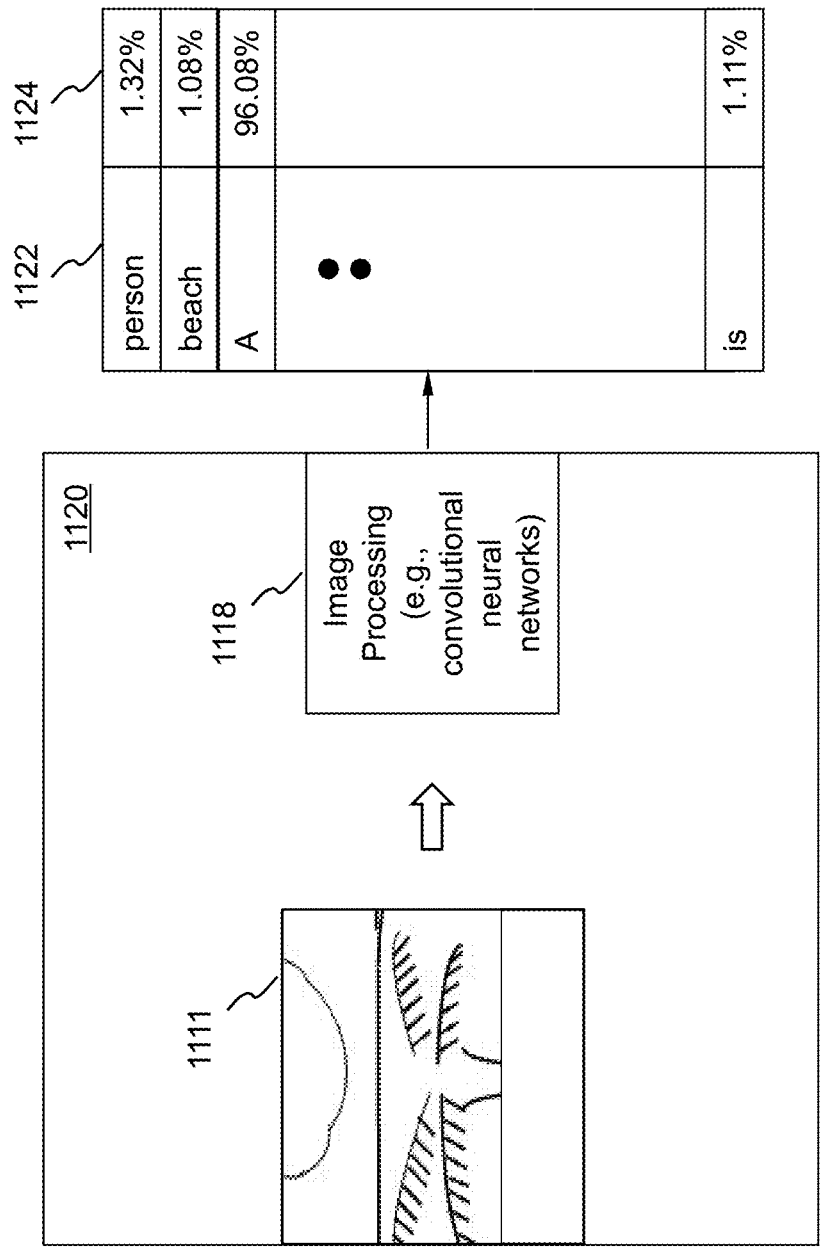
FIGS. 11A-11C are a series of schematic diagrams showing an example prediction-style image classification technique to obtain next token of an image caption of an image in accordance with an embodiment of the invention.
Figure 11B:
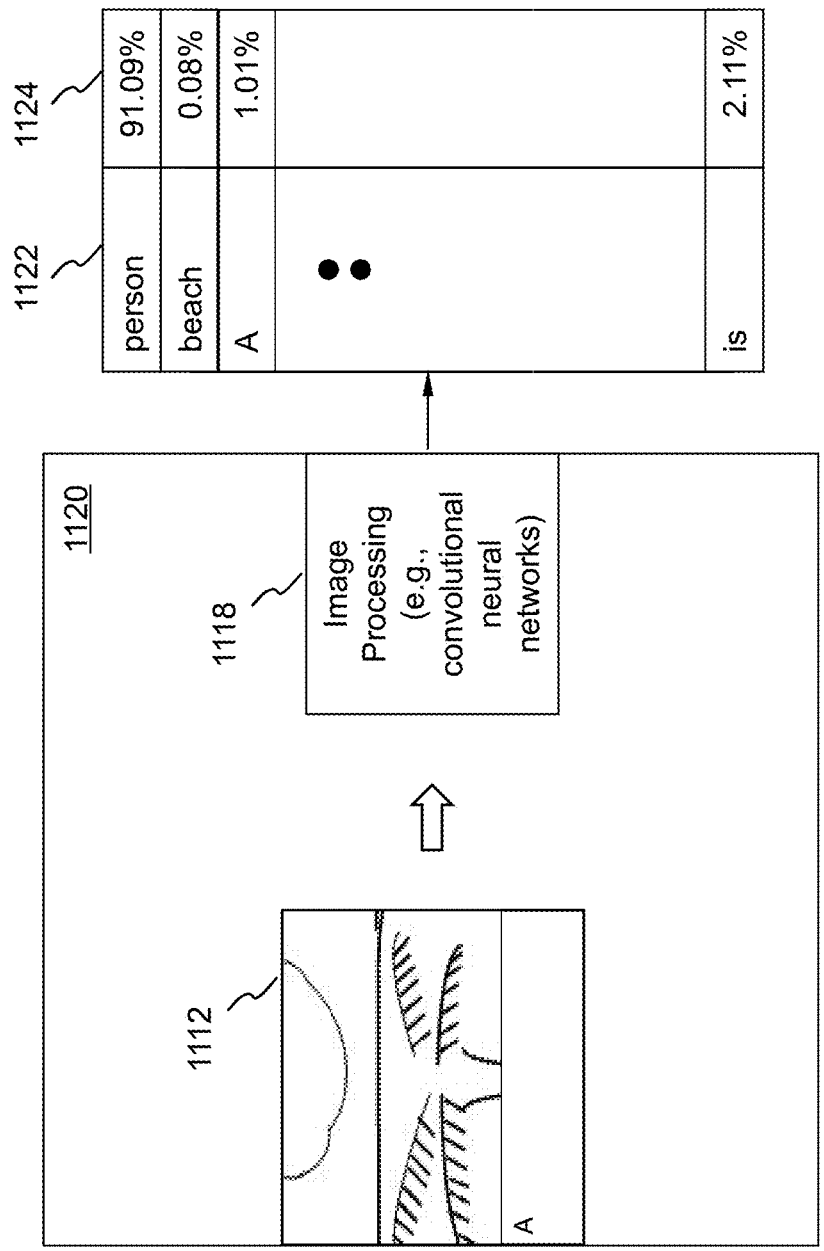
Figure 11C:
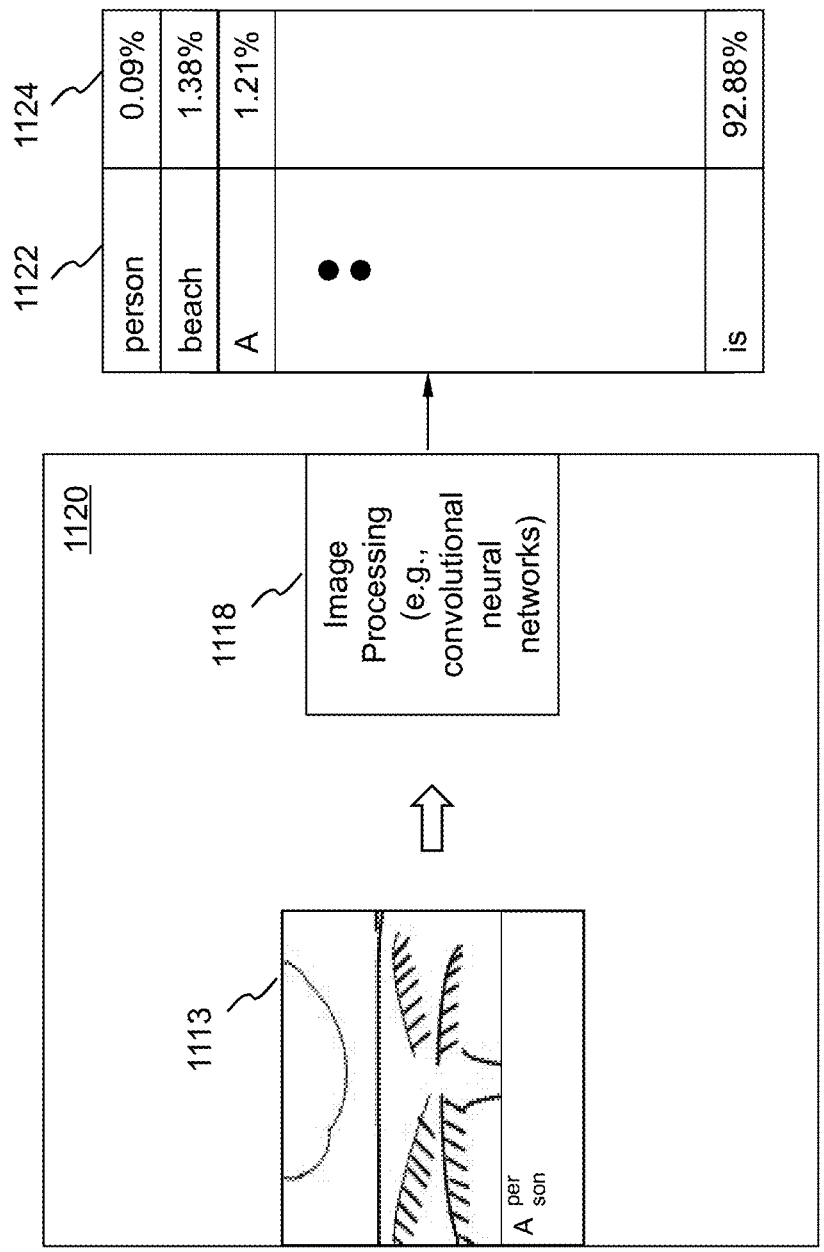

FIGS. 11A-11C are schematic diagrams showing an example prediction-style image classification technique. In the first prediction of next token of an image caption, input image 1111 (i.e., 2-D symbol 500a) is classified in a computing system 1120 using an image classification technique 1118 (e.g., a deep learning model loaded with pre-trained filter coefficients).

The image processing technique 1118 includes predefining a set of categories 1122 (e.g., "person", "beach", "A", . . . , "is" shown in FIG. 11A). As a result of performing the image processing technique 1118, respective probabilities 1124 of the categories (i.e., a set of words in a dictionary as a database) are determined for the input image 1111. In the example shown in FIG. 11A, the highest probability of 96.08 percent is shown for the word "A". In other words, the input image 1111 has a probability of 96.08 percent chance to be associated with "A" amongst all the predefined categories 1122. After "A" has been predicted as the next token of the image caption, graphical representation of the word "A" is placed in the image caption portion of the 2-D symbol, which is the input image 1112 shown in FIG. 11B. After the input image 1112 is processed through the image processing technique 1118, the most probable category is "person" with 91.09%. The 2-D symbol is then modified again by appending graphical representation of "person" to the current state of the image caption as input image 1113 shown in FIG. 11C. The resulting category is "is" with probability of 92.88%. The procedure continues until a termination condition is met. The image caption of the image is thus created.

A labeled training database or dataset contains a set of words in a dictionary is used for training a deep learning model based on the prediction-style image classification technique. The dictionary containing vocabulary of a natural language (e.g., Latin-alphabet based languages, CJK languages, etc.) is created based on a predefined number of occurrence in the labeled training dataset. When the predicted next token has not been labeled or handled during the training of the deep learning model, a special category of unknown (UNK) word marker is used.

Figure 12:
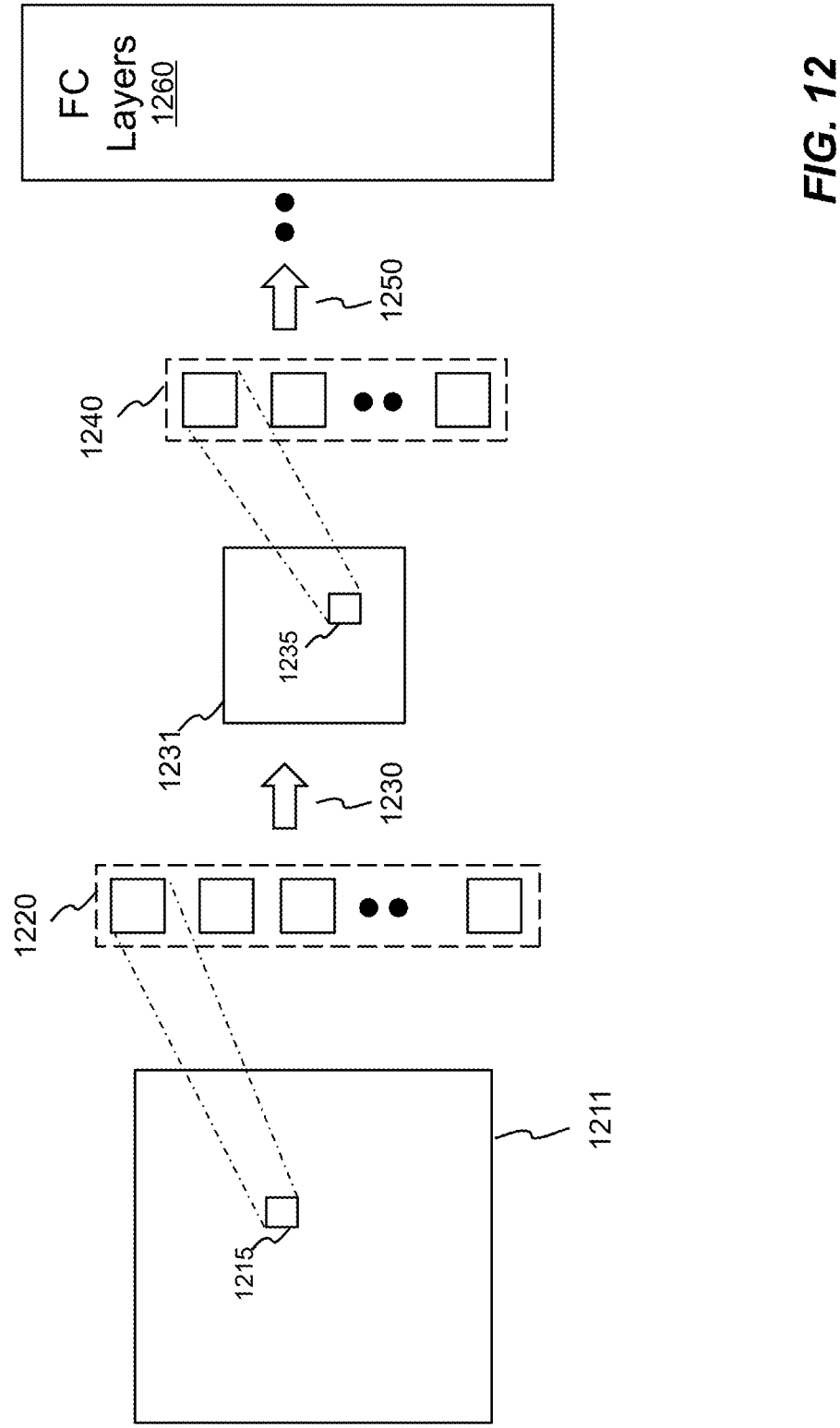
FIG. 12 is a schematic diagram showing an example image processing technique based on convolutional neural networks in accordance with an embodiment of the invention.

FIG. 12 is a schematic diagram showing an example image processing technique based on convolutional neural networks.

Based on convolutional neural networks, an input imagery data 1211 (e.g., a series of 2-D symbols, one a time) is processed with convolution operations using a first set of filters or weights 1220. Since the imagery data of the 2-D symbol 1211 is larger than the filters 1220. Each corresponding overlapped sub-region 1215 of the imagery data is processed. After the convolutional results are obtained, activation may be conducted before a first pooling operation 1230. In one embodiment, activation is achieved with rectification performed in a rectified linear unit (ReLU). As a result of the first pooling operation 1230, the imagery data is reduced to a reduced set of imagery data 1231. For 2×2 pooling, the reduced set of imagery data is reduced by a factor of 4 from the previous set.

The previous convolution-to-pooling procedure is repeated. The reduced set of imagery data 1231 is then processed with convolutions using a second set of filters 1240. Similarly, each overlapped sub-region 1235 is processed. Another activation can be conducted before a second pooling operation 1240. The convolution-to-pooling procedures are repeated for several layers and finally connected to a Fully-connected (FC) Layers 1260. In image classification, respective probabilities of predefined set of categories can be computed in FC Layers 1260.

This repeated convolution-to-pooling procedure is trained using a known dataset or database (e.g., a set of words in a dictionary). For image classification, the dataset contains the predefined categories. A particular set of filters, activation and pooling can be tuned and obtained before use for classifying an imagery data, for example, a specific combination of filter types, number of filters, order of filters, pooling types, and/or when to perform activation.

In one embodiment, convolutional neural networks are based on a Visual Geometry Group (VGG-16) architecture neural nets.

Figure 13:
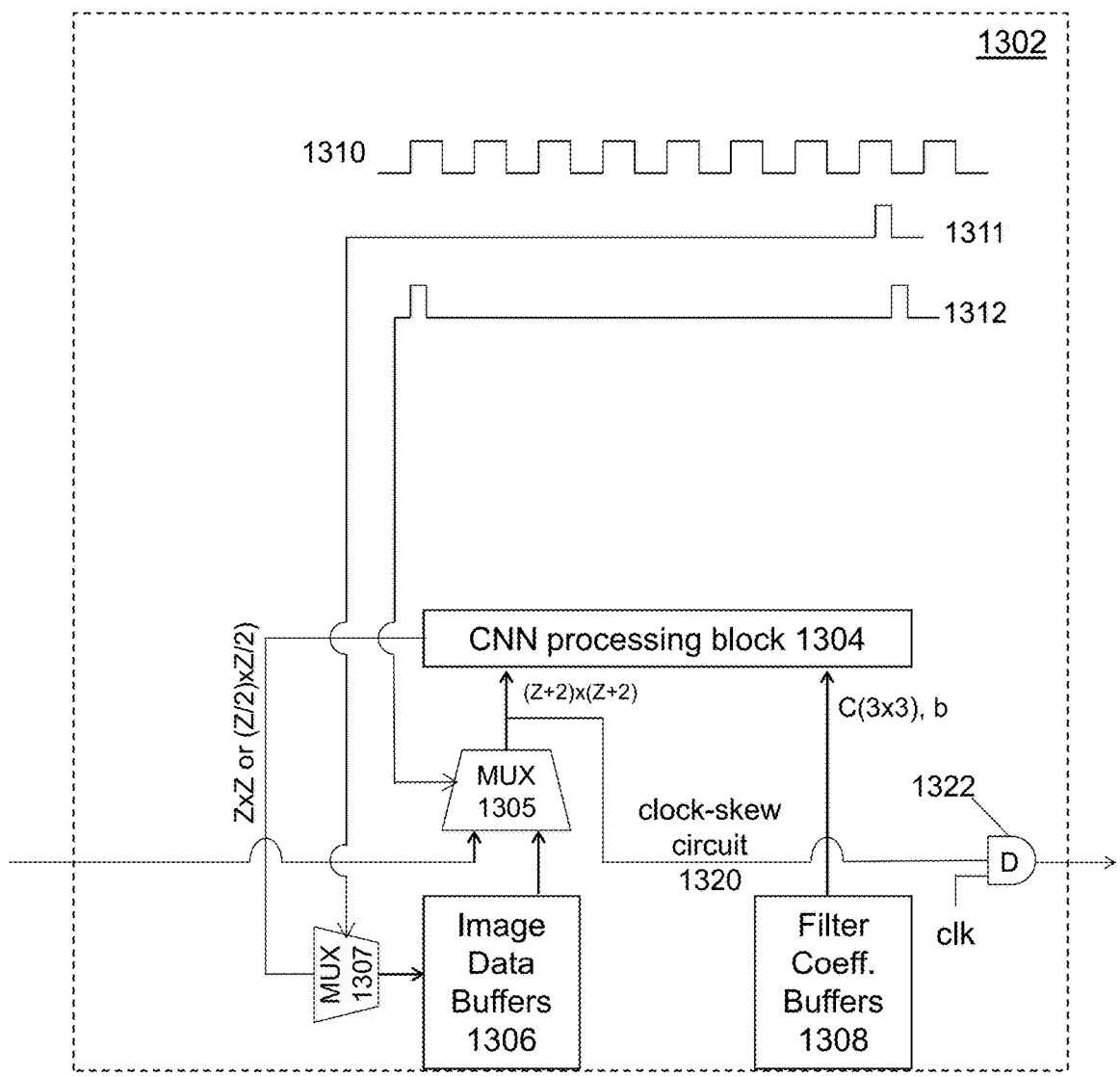
FIG. 13 is a diagram showing an example CNN processing engine in a CNN based integrated circuit, according to one embodiment of the invention.

More details of a CNN processing engine 1302 in a CNN based integrated circuit are shown in FIG. 13. A CNN processing block 1304 contains digital circuitry that simultaneously obtains ZxZ convolution operations results by performing 3×3 convolutions at ZxZ pixel locations using imagery data of a (Z+2)-pixel by (Z+2)-pixel region and corresponding filter coefficients from the respective memory buffers. The (Z+2)-pixel by (Z+2)-pixel region is formed with the ZxZ pixel locations as a Z-pixel by Z-pixel central portion plus a one-pixel border surrounding the central portion. Z is a positive integer. In one embodiment, Z equals to 14 and therefore, (Z+2) equals to 16, ZxZ equals to 14×14=196, and Z/2 equals 7.

Figure 14:
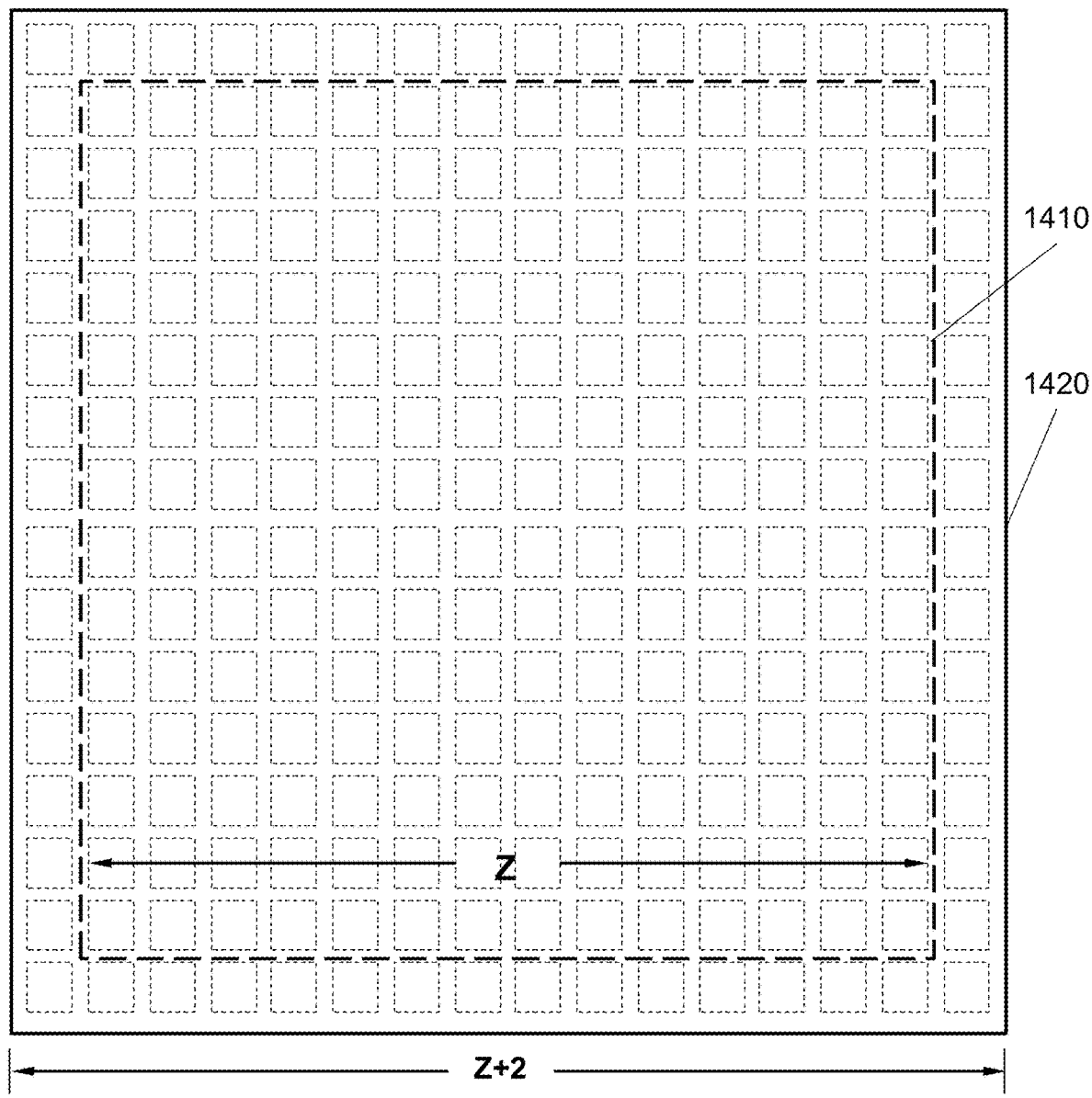
FIG. 14 is a diagram showing an example imagery data region within the example CNN processing engine of FIG. 13, according to an embodiment of the invention.

FIG. 14 is a diagram showing a diagram representing (Z+2)-pixel by (Z+2)-pixel region 1410 with a central portion of ZxZ pixel locations 1420 used in the CNN processing engine 1302.

In order to achieve faster computations, few computational performance improvement techniques have been used and implemented in the CNN processing block 1304. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\text{Out}(m, n) = \sum_{1 \le i, j \le 3} \text{In}(m, n, i, j) \times C(i, j) - b \quad (1)$$

where:
- m, n are corresponding row and column numbers for identifying which imagery data (pixel) within the (Z+2)-pixel by (Z+2)-pixel region the convolution is performed;
- In(m,n,i,j) is a 3-pixel by 3-pixel area centered at pixel location (m, n) within the region;
- C(i, j) represents one of the nine weight coefficients C(3×3), each corresponds to one of the 3-pixel by 3-pixel area;
- b represents an offset coefficient; and
- j are indices of weight coefficients C(i, j).

Each CNN processing block 1304 produces ZxZ convolution operations results simultaneously and, all CNN processing engines perform simultaneous operations. In one embodiment, the 3×3 weight or filter coefficients are each 12-bit while the offset or bias coefficient is 16-bit or 18-bit.

Figure 15A:
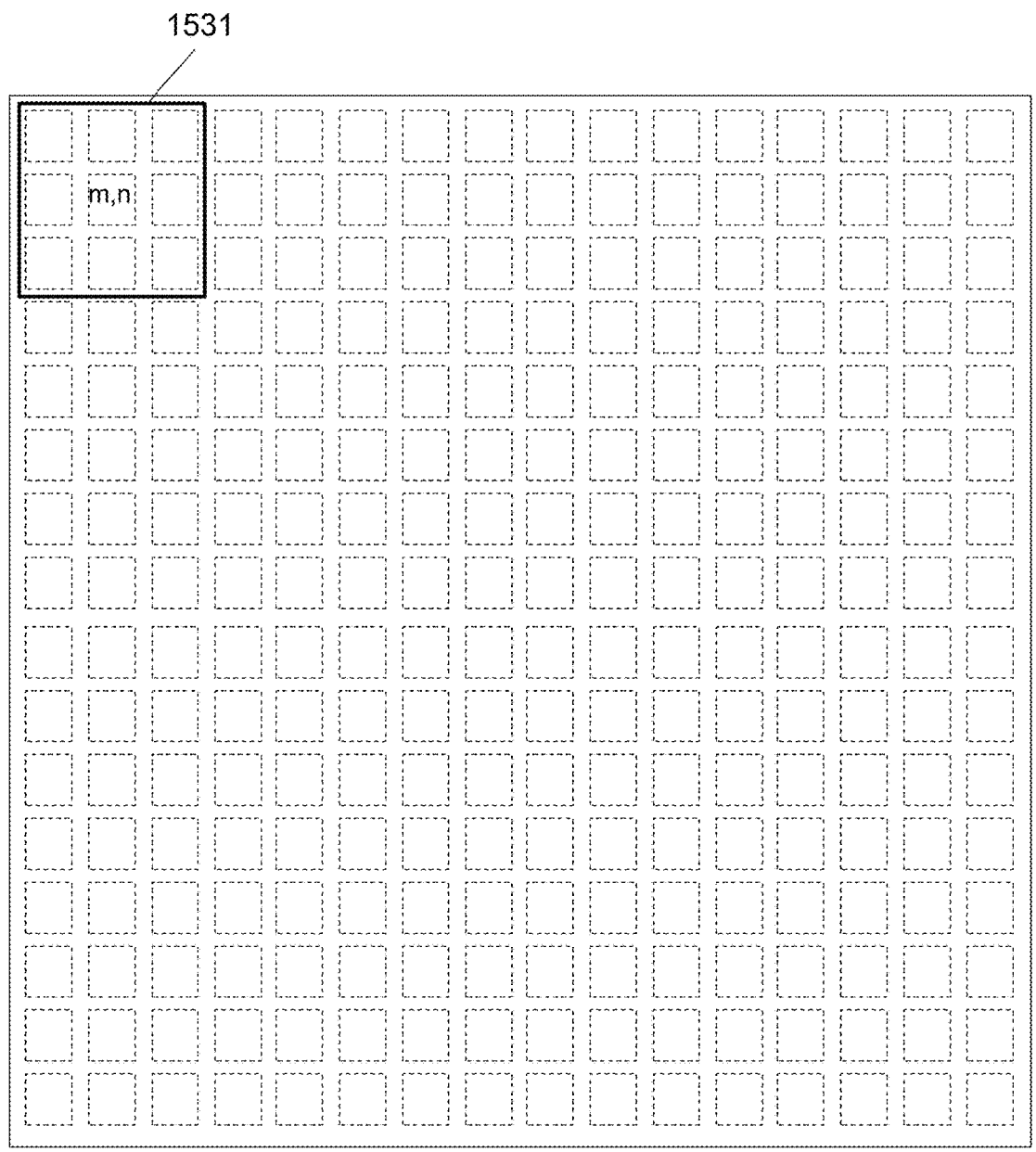
FIGS. 15A-15C are diagrams showing three example pixel locations within the example imagery data region of FIG. 13, according to an embodiment of the invention.
Figure 15B:
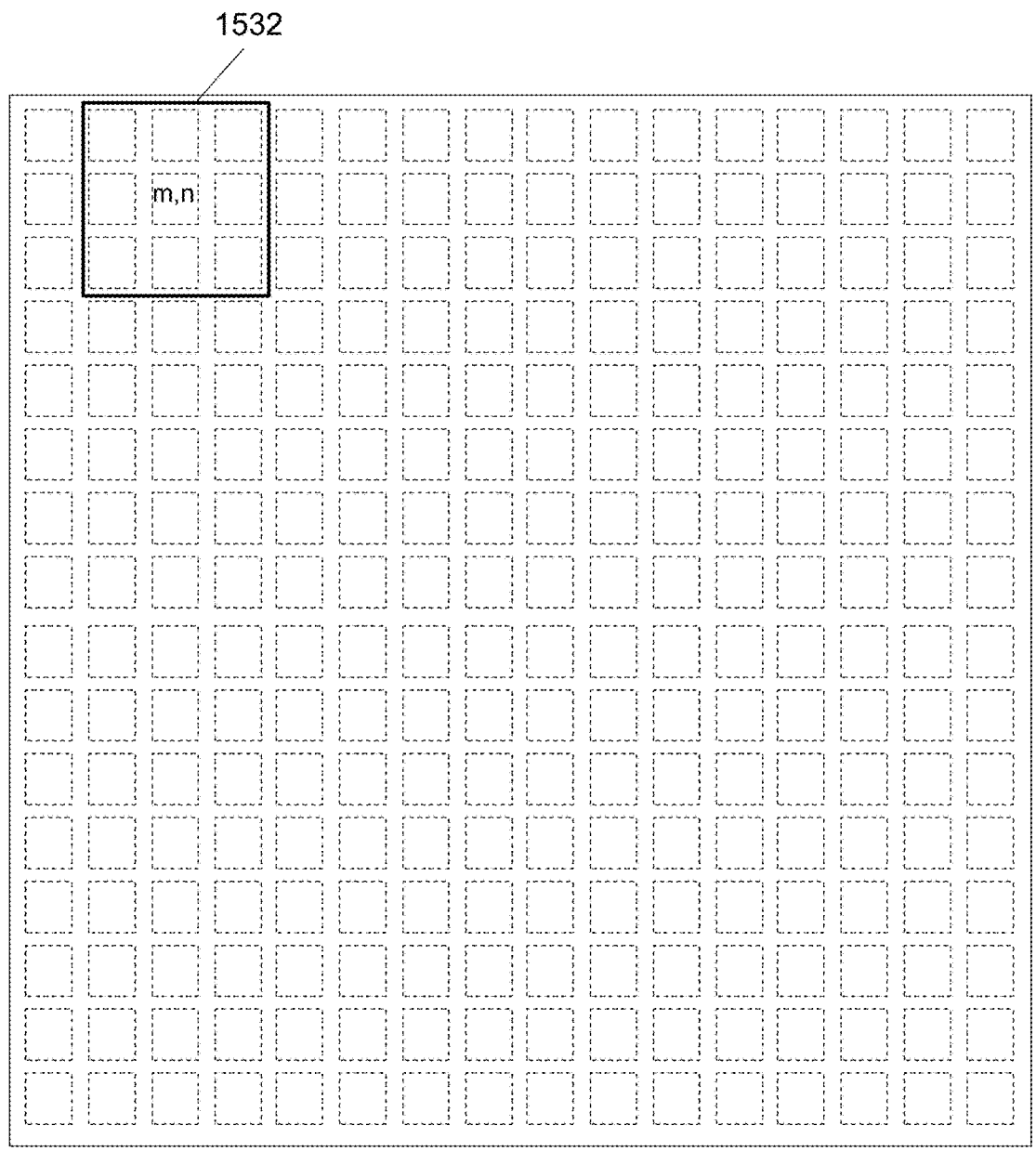
Figure 15C:
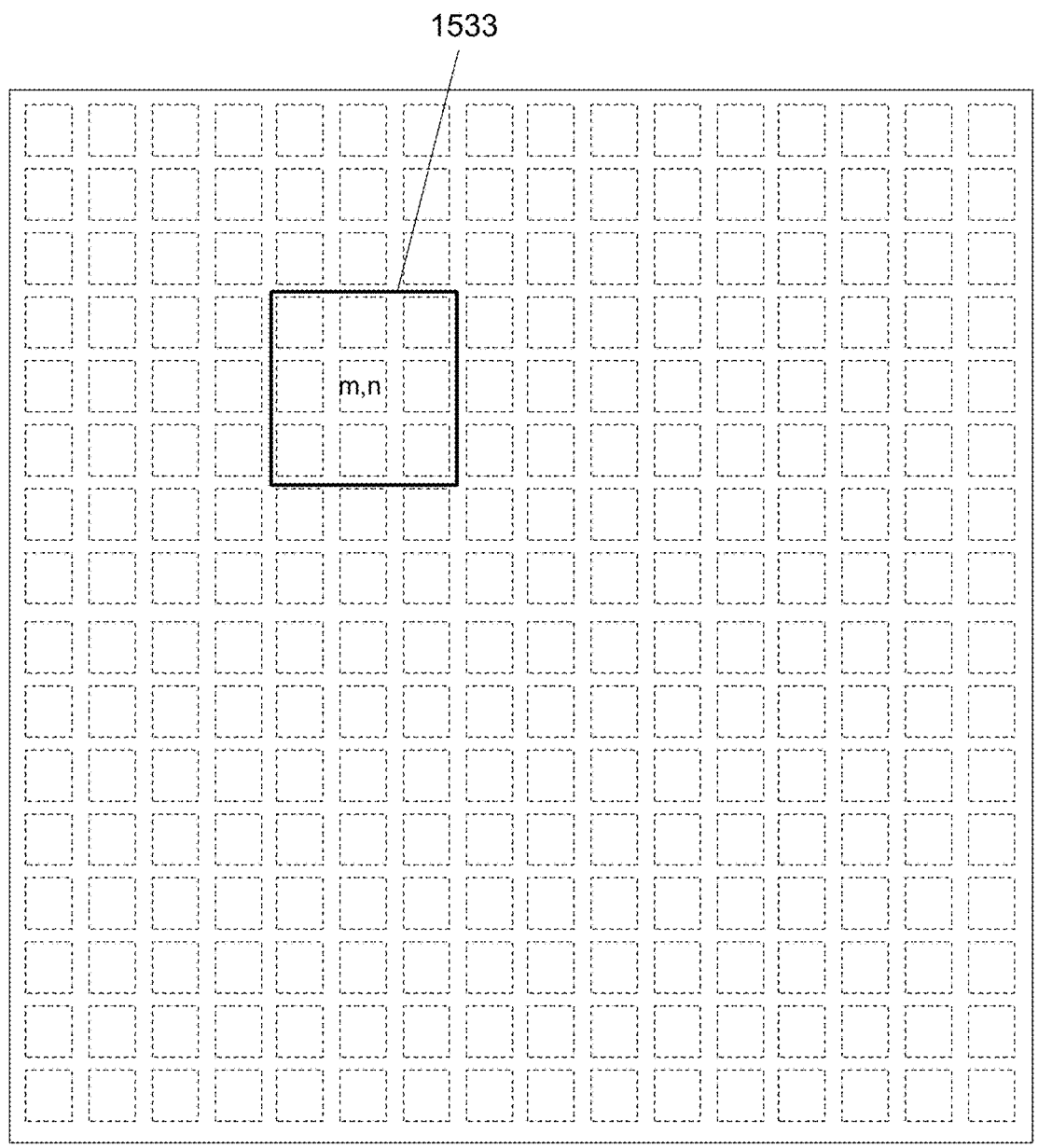

FIGS. 15A-15C show three different examples of the ZxZ pixel locations. The first pixel location 1531 shown in FIG. 15A is in the center of a 3-pixel by 3-pixel area within the (Z+2)-pixel by (Z+2)-pixel region at the upper left corner. The second pixel location 1532 shown in FIG. 15B is one pixel data shift to the right of the first pixel location 1531. The third pixel location 1533 shown in FIG. 15C is a typical example pixel location. ZxZ pixel locations contain multiple overlapping 3-pixel by 3-pixel areas within the (Z+2)-pixel by (Z+2)-pixel region.

Figure 16:
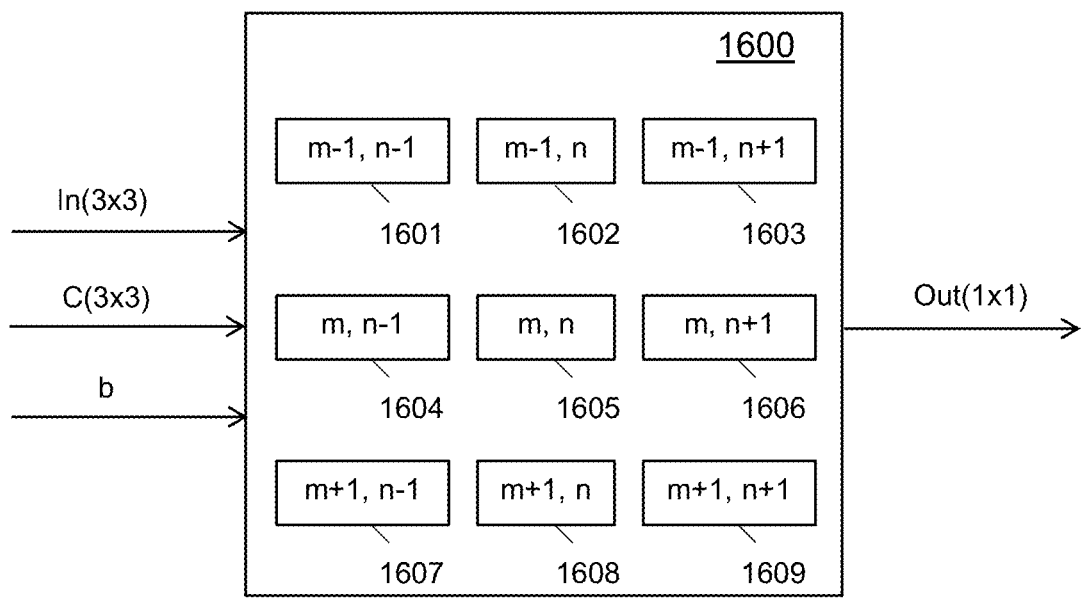
FIG. 16 is a diagram illustrating an example data arrangement for performing 3×3 convolutions at a pixel location in the example CNN processing engine of FIG. 13, according to one embodiment of the invention.

To perform 3×3 convolutions at each sampling location, an example data arrangement is shown in FIG. 16. Imagery data (i.e., In(3×3)) and filter coefficients (i.e., weight coefficients C(3×3) and an offset coefficient b) are fed into an example CNN 3×3 circuitry 1600. After 3×3 convolutions operation in accordance with Formula (1), one output result (i.e., Out(1×1)) is produced. At each sampling location, the imagery data In(3×3) is centered at pixel coordinates (m, n) 1605 with eight immediate neighbor pixels 1601-1604, 1606-1609.

Imagery data are stored in a first set of memory buffers 1306, while filter coefficients are stored in a second set of memory buffers 1308. Both imagery data and filter coefficients are fed to the CNN block 1304 at each clock of the digital integrated circuit. Filter coefficients (i.e., C(3×3) and b) are fed into the CNN processing block 1304 directly from the second set of memory buffers 1308. However, imagery data are fed into the CNN processing block 1304 via a multiplexer MUX 1305 from the first set of memory buffers 1306. Multiplexer 1305 selects imagery data from the first set of memory buffers based on a clock signal (e.g., pulse 1312).

Otherwise, multiplexer MUX 1305 selects imagery data from a first neighbor CNN processing engine (from the left side of FIG. 13 not shown) through a clock-skew circuit 1320.

At the same time, a copy of the imagery data fed into the CNN processing block 1304 is sent to a second neighbor CNN processing engine (to the right side of FIG. 13 not shown) via the clock-skew circuit 1320. Clock-skew circuit 1320 can be achieved with known techniques (e.g., a D flip-flop 1322).

After 3×3 convolutions for each group of imagery data are performed for predefined number of filter coefficients, convolution operations results Out(m, n) are sent to the first set of memory buffers via another multiplex MUX 1307 based on another clock signal (e.g., pulse 1311). An example clock cycle 1310 is drawn for demonstrating the time relationship between pulse 1311 and pulse 1312. As shown pulse 1311 is one clock before pulse 1312, as a result, the 3×3 convolution operations results are stored into the first set of memory buffers after a particular block of imagery data has been processed by all CNN processing engines through the clock-skew circuit 1320.

After the convolution operations result Out(m, n) is obtained from Formula (1), activation procedure may be performed. Any convolution operations result, Out(m, n), less than zero (i.e., negative value) is set to zero. In other words, only positive value of output results are kept. For example, positive output value 10.5 retains as 10.5 while −2.3 becomes 0. Activation causes non-linearity in the CNN based integrated circuits.

If a 2×2 pooling operation is required, the ZxZ output results are reduced to (Z/2)×(Z/2). In order to store the (Z/2)×(Z/2) output results in corresponding locations in the first set of memory buffers, additional bookkeeping techniques are required to track proper memory addresses such that four (Z/2)×(Z/2) output results can be processed in one CNN processing engine.

Figure 17A:
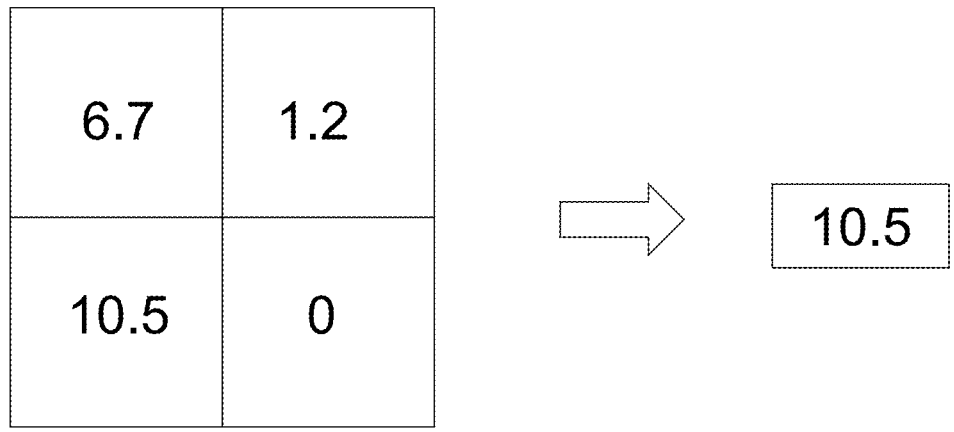
FIGS. 17A-17B are diagrams showing two example 2×2 pooling operations according to an embodiment of the invention.
Figure 17B:
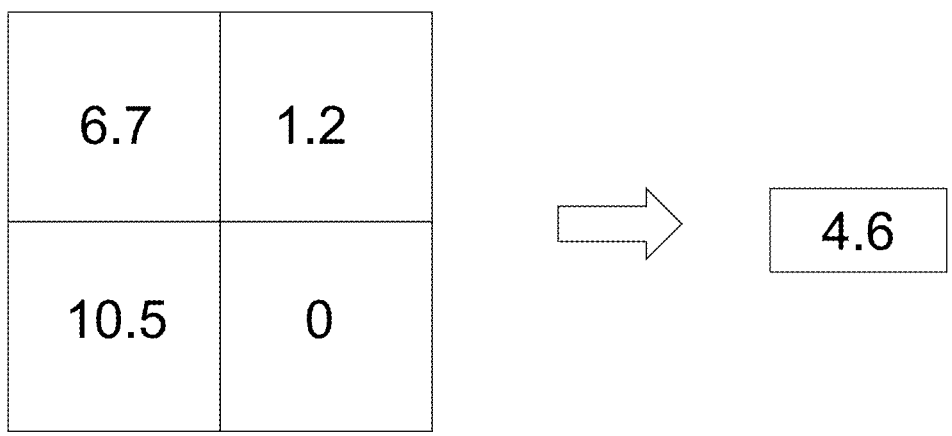
Figure 18:
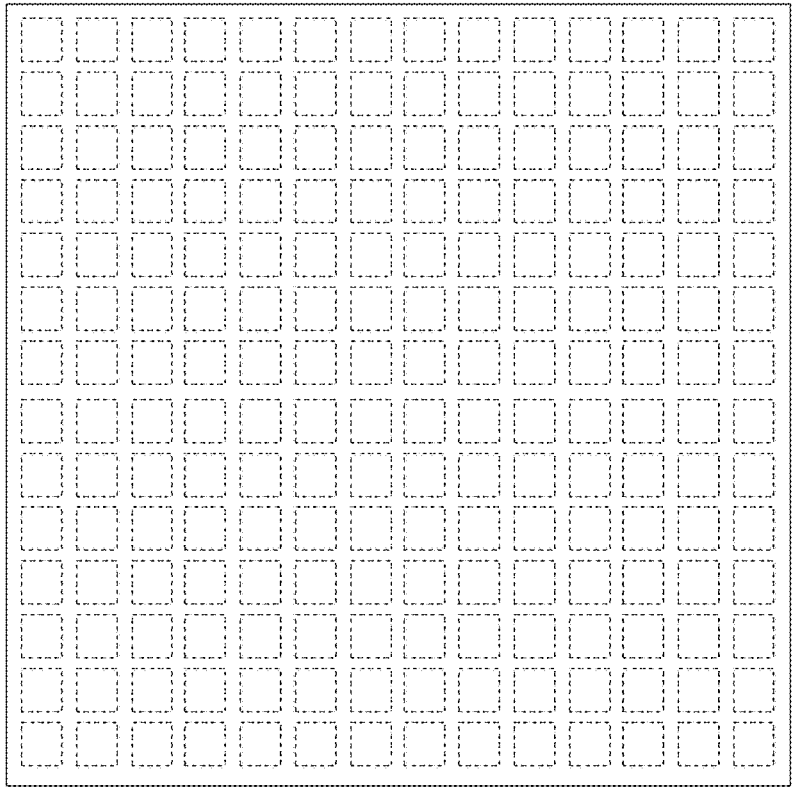
FIG. 18 is a diagram illustrating a 2×2 pooling operation of an imagery data in the example CNN processing engine of FIG. 13, according to one embodiment of the invention.
Figure 18:
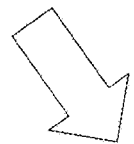
Figure 18:
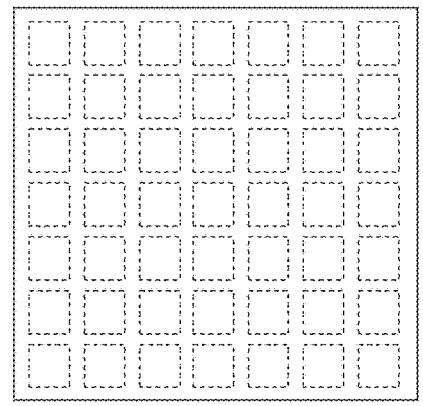

To demonstrate a 2×2 pooling operation, FIG. 17A is a diagram graphically showing first example output results of a 2-pixel by 2-pixel block being reduced to a single value 10.5, which is the largest value of the four output results. The technique shown in FIG. 17A is referred to as "max pooling". When the average value 4.6 of the four output results is used for the single value shown in FIG. 17B, it is referred to as "average pooling". There are other pooling operations, for example, "mixed max average pooling" which is a combination of "max pooling" and "average pooling". The main goal of the pooling operation is to reduce the size of the imagery data being processed. FIG. 18 is a diagram illustrating ZxZ pixel locations, through a 2×2 pooling operation, being reduced to (Z/2)×(Z/2) locations, which is one fourth of the original size.

Figure 19A:
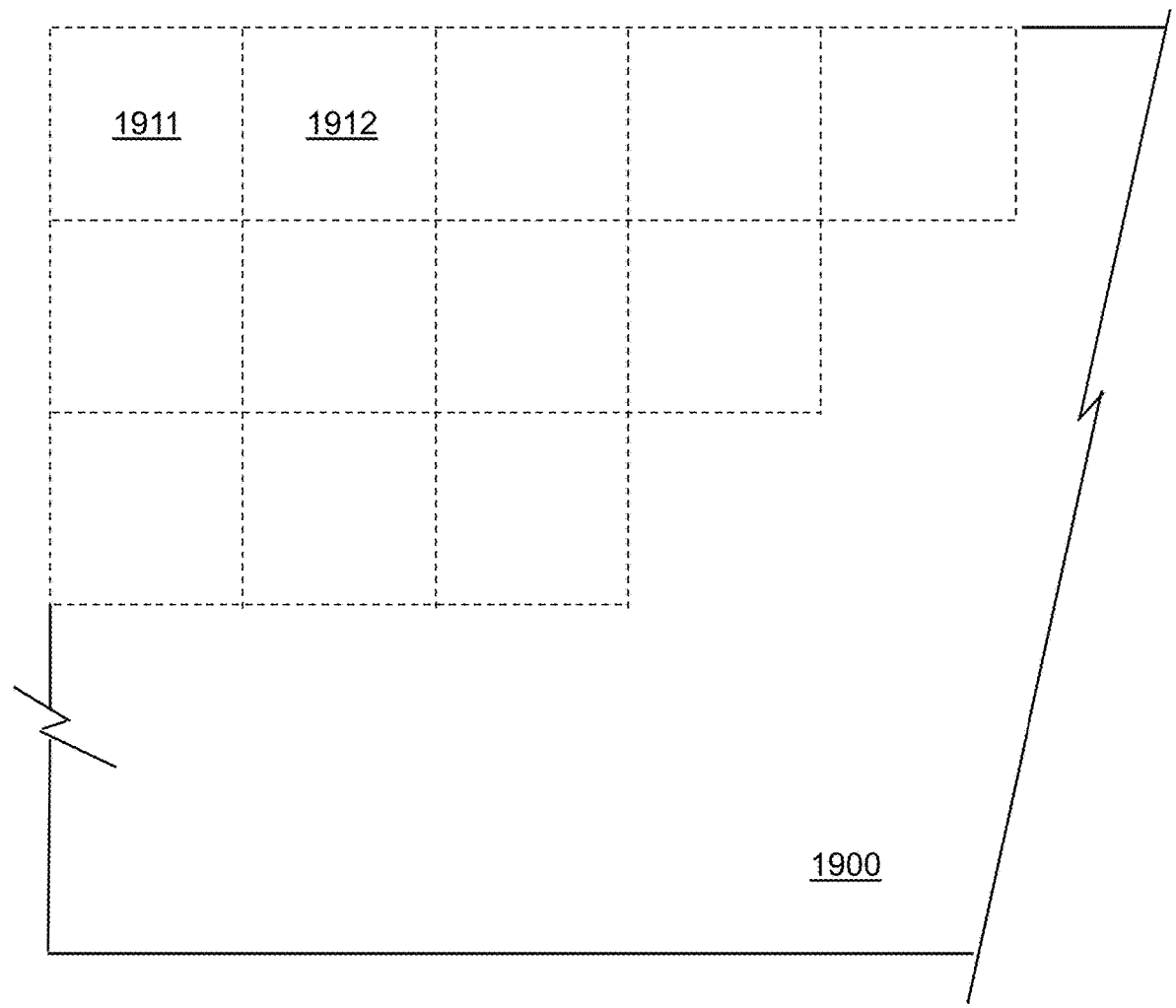
FIGS. 19A-19C are diagrams illustrating various examples of imagery data region within an input image, according to one embodiment of the invention.

An input image generally contains a large amount of imagery data. In order to perform image processing operations, an example input image 1900 is partitioned into Z-pixel by Z-pixel blocks 1911-1912 as shown in FIG. 19A. Imagery data associated with each of these Z-pixel by Z-pixel blocks is then fed into respective CNN processing engines. At each of the Z×Z pixel locations in a particular Z-pixel by Z-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with $(2^L \times Z)$-pixel by $(2^L \times Z)$-pixel is required. L is a positive integer (e.g., 1, 2, 3, 4, etc.). When Z equals 14 and L equals 4, the characteristic dimension is 224. In another embodiment, the input image is a rectangular shape with dimensions of $(2^I \times Z)$-pixel and $(2^1 \times Z)$-pixel, where I and J are positive integers.

Figure 19B:
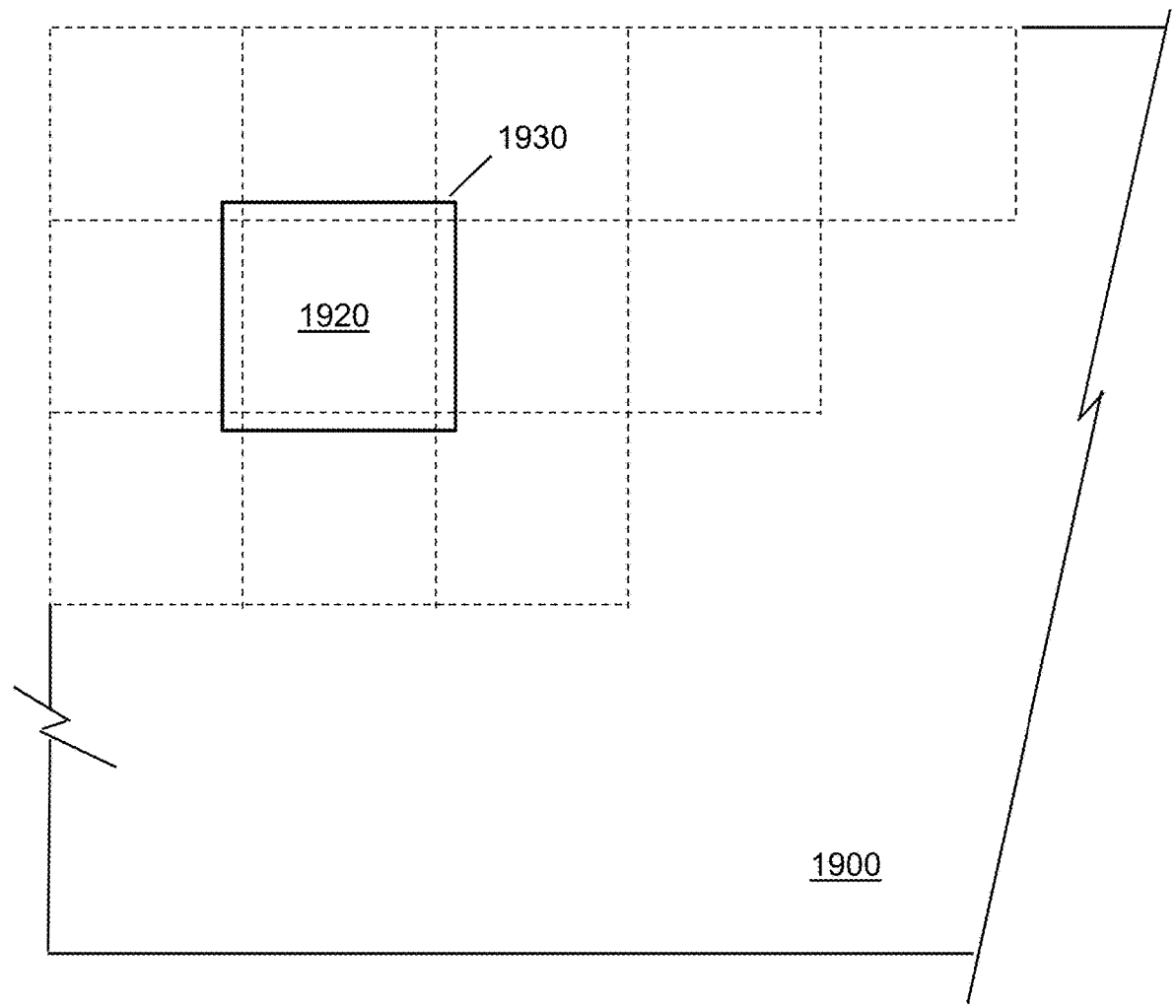

In order to properly perform 3×3 convolutions at pixel locations around the border of a Z-pixel by Z-pixel block, additional imagery data from neighboring blocks are required. FIG. 19B shows a typical Z-pixel by Z-pixel block 1920 (bordered with dotted lines) within a (Z+2)-pixel by (Z+2)-pixel region 1430. The (Z+2)-pixel by (Z+2)-pixel region is formed by a central portion of Z-pixel by Z-pixel from the current block, and four edges (i.e., top, right, bottom and left) and four corners (i.e., top-left, top-right, bottom-right and bottom-left) from corresponding neighboring blocks.

Figure 19C:
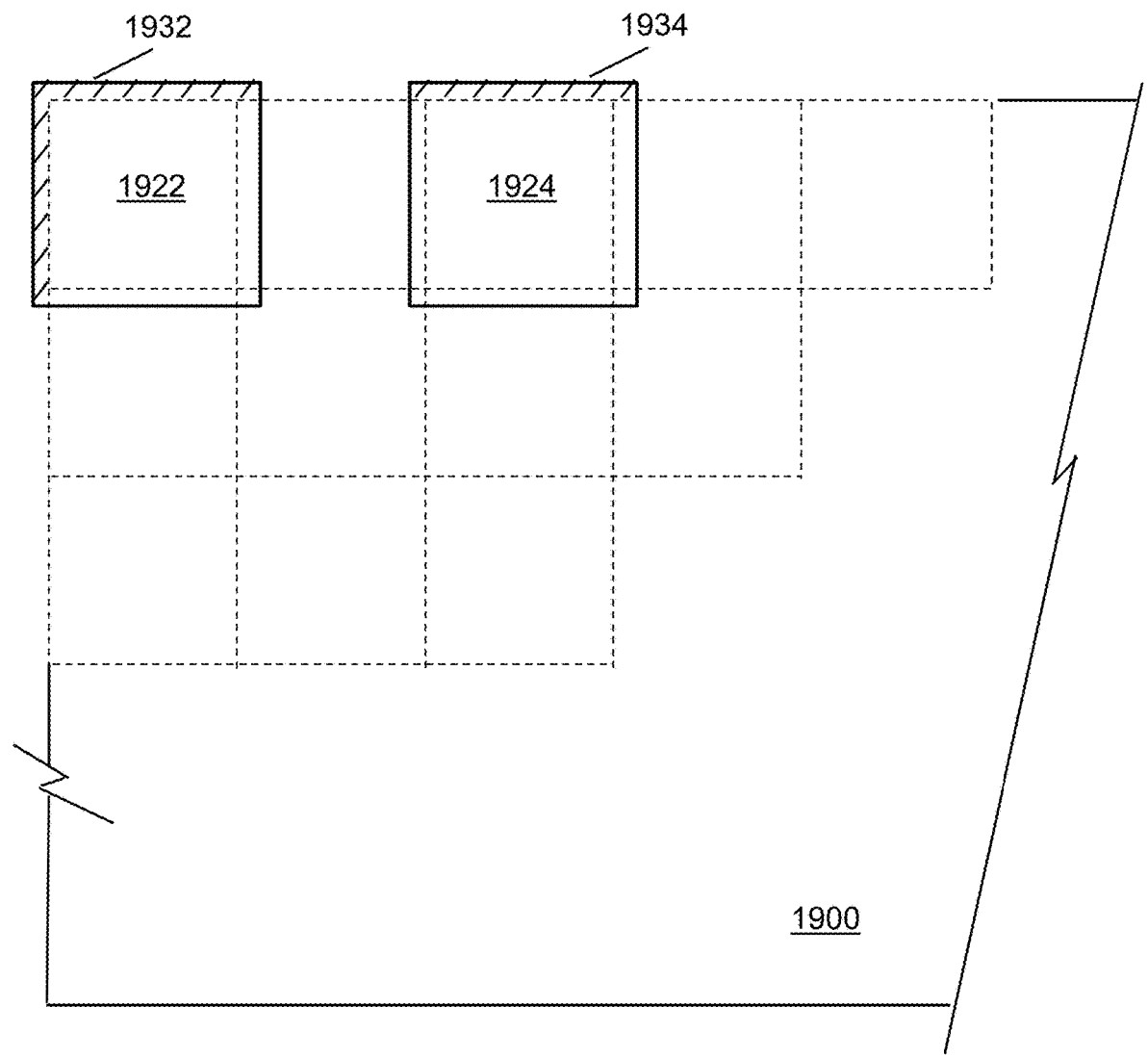

FIG. 19C shows two example Z-pixel by Z-pixel blocks 1922-1924 and respective associated (Z+2)-pixel by (Z+2)-pixel regions 1932-1934. These two-example blocks 1922-1924 are located along the perimeter of the input image. The first example Z-pixel by Z-pixel block 1922 is located at top-left corner, therefore, the first example block 1922 has neighbors for two edges and one corner. Value "0"s are used for the two edges and three corners without neighbors (shown as shaded area) in the associated (Z+2)-pixel by (Z+2)-pixel region 1932 for forming imagery data. Similarly, the associated (Z+2)-pixel by (Z+2)-pixel region 1934 of the second example block 1924 requires "0"s be used for the top edge and two top corners. Other blocks along the perimeter of the input image are treated similarly. In other words, for the purpose to perform 3×3 convolutions at each pixel of the input image, a layer of zeros ("0"s) is added outside of the perimeter of the input image. This can be achieved with many well-known techniques. For example, default values of the first set of memory buffers are set to zero. If no imagery data is filled in from the neighboring blocks, those edges and corners would contain zeros.

Figure 20:
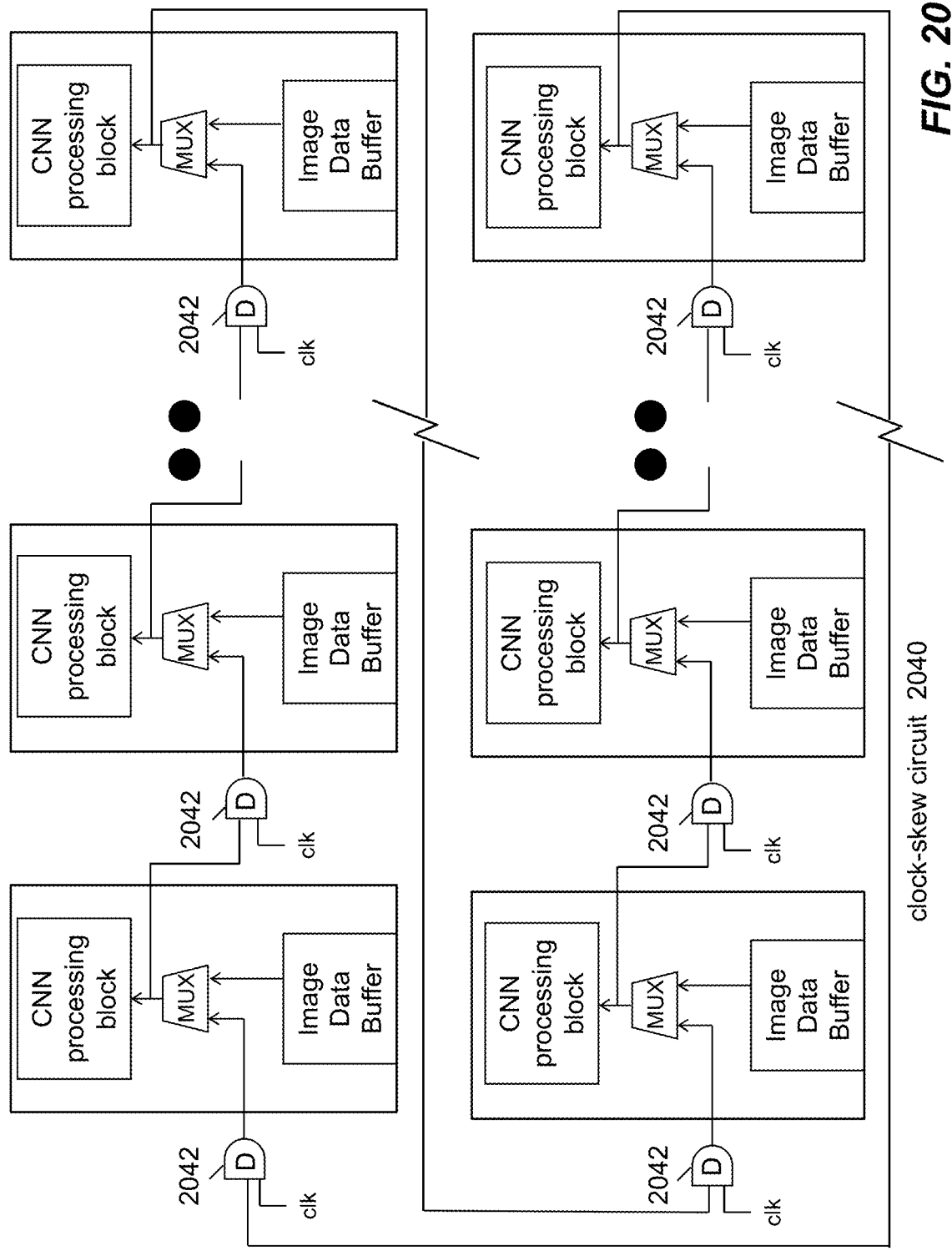
FIG. 20 is a diagram showing a plurality of CNN processing engines connected as a loop via an example clock-skew circuit in accordance of an embodiment of the invention.
Figure 21:
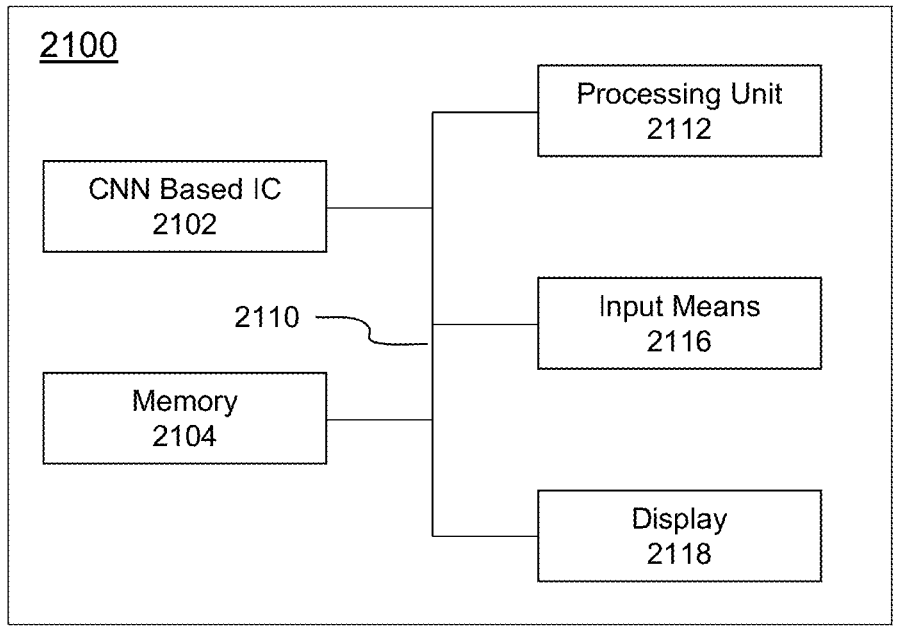
FIG. 21 is a function diagram showing a first example artificial intelligence device for keyword detection in accordance with one embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 2040 for a group of example CNN processing engines are shown in FIG. 20.

CNN processing engines connected via the second example clock-skew circuit 2040 to form a loop. In other words, each CNN processing engine sends its own imagery data to a first neighbor and, at the same time, receives a second neighbor's imagery data. Clock-skew circuit 2040 can be achieved with well-known manners. For example, each CNN processing engine is connected with a D flip-flop 2042.

The first example artificial intelligence device for extracting stories out of images 2100 is an embedded system using CNN based integrated circuit 2102 for computations of convolutional layers using pre-trained filter coefficients stored therein. Memory 2104 is configured for storing at least the received input string of texts. The processing unit 2112 controls input interface 2116 to receive input string of texts. Processing unit 2112 then forms a two-dimensional (2-D) symbol in accordance with a set of 2-D symbol creation rules using a 2-D symbol creation application module installed thereon.

The 2-D symbol is an imagery data that can be classified using a CNN based integrated circuit loaded with a deep learning model. The deep learning model contained at least multiple ordered convolutional layers, fully-connected layers, pooling operations and activation operations. Display device 2118 displays the input string of texts and later the determined category.

Figure 22:
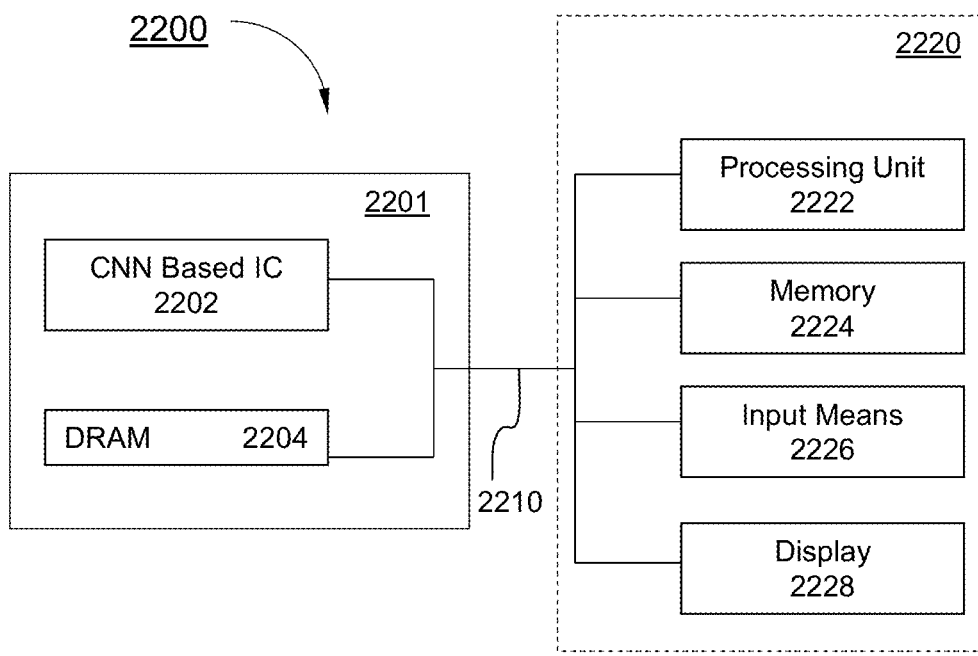
FIG. 22 is a function diagram showing a second example artificial intelligence device for keyword detection in accordance with one embodiment of the invention.

FIG. 22 shows a second example artificial intelligence device for keyword detection 2200, which contains a dongle 2201 and a host 2200 (e.g., a mobile phone) connected through a bus 2210 (e.g., USB—Universal Serial Bus).

Dongle 2201 contains a CNN based integrated circuit 2202 and a DRAM (Dynamic Random Access Memory) 2204. Host 1720 contains a processing unit 2222, memory 2224, input interface 2226 and display screen 2228. In one embodiment, when the host 2220 is a mobile phone, the input means 2226 can be through the display screen 2228 as touch screen input.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the two-dimensional symbol has been described and shown with a specific example of a matrix of 224×224 pixels, other sizes may be used for achieving substantially similar objectives of the invention, for example, 448×448. Additionally, whereas the image caption has been shown and described to be located in certain area of the 2-D symbol, other area may used for achieving the same, for example, right or left sides. Furthermore, the order of the image caption has been shown and described to be from left to right, other orders may be used for achieving the same, for example, right to left. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A method of creating an image caption of an image comprising:
    (a) receiving an image and a maximum number of tokens for an image caption to be created in a computing system;
    (b) calculating, in the computer system, a font size of a graphical image of the token from the maximum number of tokens and a dimension of a desired input image for a prediction-style image classification technique, the desired image being divided into first and second portions, wherein the dimension is N×N pixels, where N is a positive integer and a multiple of 224;

(c) forming, in the computer system, a two-dimension (2-D) symbol as the desired input image by placing a resized image in the first portion and by initializing the second portion with blank images, the resized image being derived from the received image with substantially similar contents;

(d) predicting, in the computer system, a next token of the image caption by classifying the 2-D symbol using the prediction-style image classification technique;

(e) modifying, in the computer system, the 2-D symbol by appending the graphical image of the just-predicted token to the image caption in the second portion, when a termination condition for image caption creation is false; and (f) repeating, in the computer system, (d)-(e) until the termination condition becomes true.

2. The method of claim 1, wherein the computing system comprises a Cellular Neural Networks or Cellular Nonlinear Networks (CNN) based computing system, which comprises a semi-conductor chip containing digital circuits dedicated for performing convolutional neural networks algorithms.

3. The method of claim 1, where the token is a word in Latin-alphabet based languages.

4. The method of claim 3, where the graphical image of the word in Latin-alphabet based languages comprises a squared-word format.

5. The method of claim 3, wherein the first portion is located in an upper part of the 2-D symbol and the second portion is located in a lower part of the 2-D symbol.

6. The method of claim 3, wherein the first portion is located in a lower part of the 2-D symbol and the second portion is located in an upper part of the 2-D symbol.

7. The method of claim 1, where the token is a character in Chinese, Japanese, Korean languages.

8. The method of claim 7, wherein the first portion is located in a middle part of the 2-D symbol and the second portion is located in an area surrounding the first portion.

9. The method of claim 1, wherein the termination condition is the image caption has reached the maximum number of tokens.

10. The method of claim 1, wherein the termination condition is the just-predicted token is an End-Of-Sentence (EOS) mark.

11. The method of claim 1, wherein the prediction-style image classification technique is based on convolutional neural networks and trained using a labeled database with each training image labeled with one of the set of tokens in a dictionary.

12. The method of claim 11, wherein the just-predicted token is the label of a corresponding training image in the labeled database.

13. The method of claim 11, wherein the just-predicted token is an unknown (UNK) mark, when the prediction-style image classification technique fails to find a token in the labeled database.

14. A system for creating an image caption of an image comprising:
a bus;
an input interface connecting to the bus;
a Cellular Neural Networks or Cellular Nonlinear Networks (CNN) based integrated circuit operatively connected to the bus;
a memory connecting the bus; and
a processing unit connecting to the bus;
the system being configured for performing following operations:

(a) receiving, via the input interface and the memory, an image and a maximum number of tokens for an image caption to be created in a computing system;

(b) calculating, in the processing unit and the memory, a font size of a graphical image of the token from the maximum number of tokens and a dimension of a desired input image for a prediction-style image classification technique, the desired image being divided into first and second portions, wherein the dimension is N×N pixels, where N is a positive integer and a multiple of 224;

(c) forming, in the processing unit and the memory, a two-dimension (2-D) symbol as the desired input image by placing a resized image in the first portion and by initializing the second portion with blank images, the resized image being derived from the received image with substantially similar contents;

(d) predicting, in the CNN based integrated circuit, the memory and the processing unit, a next token of the image caption by classifying the 2-D symbol using the prediction-style image classification technique;

(e) modifying in the processing unit and the memory, the 2-D symbol by appending the graphical image of the just-predicted token to the image caption in the second portion, when a termination condition for image caption creation is false; and (f) repeating, in the CNN based integrated circuit, the memory and the processing unit, (d)-(e) until the termination condition becomes true.

15. The system of claim 14, where the token is a word in Latin-alphabet based language.

16. The system of claim 14, where the graphical image of the word in Latin-alphabet based language comprises a squared-word format.

17. The system of claim 14, where the token is a character in Chinese, Japanese, Korean language.

18. The system of claim 14, wherein the CNN based integrated circuit comprises a plurality of CNN processing engines operatively coupled to at least one input/output data bus, the plurality of CNN processing engines being connected in a loop with a clock-skew circuit, each CNN processing engine comprising:
a CNN processing block configured for simultaneously performing convolutional operations using input imagery data and pre-trained filter coefficients of a plurality of ordered convolutional layers;
a first set of memory buffers operatively coupled to the CNN processing block for storing the input imagery data; and
a second set of memory buffers operatively coupled to the CNN processing block for storing the pre-trained filter coefficients.

* * * * *